United States Patent
Kim et al.

(10) Patent No.: US 10,058,224 B2
(45) Date of Patent: *Aug. 28, 2018

(54) ROBOT CLEANER SYSTEM AND CONTROL METHOD OF THE SAME

(71) Applicant: LG ELECTRONICS INC., Seoul (KR)

(72) Inventors: Sangyun Kim, Seoul (KR); Younggie Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/248,863

(22) Filed: Aug. 26, 2016

(65) Prior Publication Data

US 2017/0079498 A1    Mar. 23, 2017

Related U.S. Application Data

(63) Continuation of application No. 14/062,633, filed on Oct. 24, 2013, now Pat. No. 9,675,226.

(30) Foreign Application Priority Data

Oct. 26, 2012  (KR) .................. 10-2012-0119843
Sep. 5, 2013   (KR) .................. 10-2013-0106870

(51) Int. Cl.
*A47L 9/00*   (2006.01)
*A47L 11/00*  (2006.01)
(Continued)

(52) U.S. Cl.
CPC ......... *A47L 11/4011* (2013.01); *A47L 9/2894* (2013.01); *A47L 11/4008* (2013.01);
(Continued)

(58) Field of Classification Search
CPC .... A47L 9/00; G05D 1/00; G06T 7/00; Y10S 901/01
See application file for complete search history.

(56) References Cited

U.S. PATENT DOCUMENTS 7,066,291 B2   6/2006  Martins
8,749,196 B2   6/2014  Cohen
(Continued)

FOREIGN PATENT DOCUMENTS

CN    1354073    6/2002
CN    1381340    11/2002
(Continued)

OTHER PUBLICATIONS

European Search Report dated Dec. 5, 2016 issued in Application No. 16178884.9.
(Continued)

*Primary Examiner* — Yonel Beaulieu
(74) *Attorney, Agent, or Firm* — KED & Associates, LLP

(57) ABSTRACT

A robot cleaner system may include a robot cleaner that may be automatically driven while performing a cleaning operation, a recharging base that receives the robot cleaner, and a remote control device that remotely controls the robot cleaner. The remote control device may also generate mapping information between an actual region and a virtual region based on image information generated by a camera provided on the robot cleaner, and/or image information generated by a camera on the recharging base.

20 Claims, 18 Drawing Sheets

(51) Int. Cl.
    *G06T 7/00*     (2017.01)
    *A47L 11/40*    (2006.01)
    *A47L 9/28*     (2006.01)
    *G05D 1/00*     (2006.01)
    *G06T 7/73*     (2017.01)
    *G08C 17/02*    (2006.01)

(52) U.S. Cl.
    CPC ....... *A47L 11/4013* (2013.01); *A47L 11/4044* (2013.01); *A47L 11/4061* (2013.01); *G05D 1/0016* (2013.01); *G05D 1/0022* (2013.01); *G05D 1/0033* (2013.01); *G05D 1/0044* (2013.01); *G06T 7/73* (2017.01); *A47L 2201/04* (2013.01); *G05D 2201/0203* (2013.01); *G05D 2201/0215* (2013.01); *G06T 2207/30204* (2013.01); *G08C 17/02* (2013.01)

(56) References Cited

U.S. PATENT DOCUMENTS

| | | | |
|---|---|---|---|
| 8,843,245 | B2 | 9/2014 | Choe |
| 8,854,001 | B2 | 10/2014 | Cohen |
| 9,215,957 | B2 * | 12/2015 | Cohen .................. A47L 9/2857 |
| 9,226,632 | B2 * | 1/2016 | Cho ...................... A47L 9/2805 |
| 9,675,226 | B2 * | 6/2017 | Kim ..................... A47L 9/2894 |
| 2004/0083570 | A1 | 5/2004 | Song et al. |
| 2007/0081695 | A1 | 4/2007 | Foxlin et al. |
| 2008/0082208 | A1 * | 4/2008 | Hong .................. G05D 1/0246 700/245 |
| 2008/0091303 | A1 | 4/2008 | Jung et al. |
| 2009/0172605 | A1 | 7/2009 | Ahn |
| 2010/0063629 | A1 | 3/2010 | Battisti |
| 2011/0004259 | A1 | 1/2011 | Stallings |
| 2011/0105896 | A1 | 5/2011 | Zagorchev et al. |
| 2011/0264305 | A1 | 10/2011 | Choe et al. |
| 2012/0121127 | A1 | 5/2012 | Aoki et al. |
| 2012/0287266 | A1 | 11/2012 | Varekamp |
| 2012/0323365 | A1 | 12/2012 | Taylor |
| 2013/0060379 | A1 | 3/2013 | Choe et al. |
| 2014/0116469 | A1 * | 5/2014 | Kim ...................... A47L 9/2894 134/18 |
| 2014/0142757 | A1 * | 5/2014 | Ziegler ................... B25J 5/007 700/255 |
| 2015/0057800 | A1 * | 2/2015 | Cohen .................. A47L 9/2857 700/258 |
| 2015/0158174 | A1 * | 6/2015 | Romanov ........... A47L 11/4011 700/250 |
| 2016/0144512 | A1 | 5/2016 | Kim |
| 2017/0079498 | A1 * | 3/2017 | Kim ..................... A47L 9/2894 |

FOREIGN PATENT DOCUMENTS

| | | |
|---|---|---|
| CN | 1493246 | 5/2004 |
| CN | 1517188 A | 8/2004 |
| CN | 1636685 A | 7/2005 |
| CN | 1745693 | 3/2006 |
| CN | 2843326 | 12/2006 |
| CN | 101084817 A | 12/2007 |
| CN | 101194813 | 6/2008 |
| CN | 101621952 A | 1/2010 |
| CN | 102012706 | 4/2011 |
| CN | 1062656532 | 9/2012 |
| EP | 1 548 532 A1 | 6/2005 |
| EP | 2 294 960 | 3/2011 |
| EP | 2 381 328 | 10/2011 |
| EP | 2 395 474 | 12/2011 |
| EP | 2 466 411 | 6/2012 |
| JP | 2003-018670 A | 1/2003 |
| JP | 2003-254716 | 9/2003 |
| JP | 2012-104060 | 5/2012 |
| JP | 2012-193980 | 10/2012 |
| KR | 10-2006-0110479 | 10/2006 |
| KR | 2008-0029548 A | 4/2008 |
| KR | 10-2011-0035038 | 4/2011 |
| KR | 2011-0119118 | 11/2011 |
| KR | 10-2013-0030943 | 3/2013 |

OTHER PUBLICATIONS

European Search Report dated Dec. 8, 2016 issued in Application No. 16178895.5.
U.S. Notice of Allowance dated Jan. 31, 2017 issued in co-pending U.S. Appl. No. 14/062,633.
U.S. Office Action for parent U.S. Appl. No. 14/062,633 dated May 10, 2016.
U.S. Notice of Allowance issued in U.S. Appl. No. 14/062,633 dated May 10, 2016.
European Search Report dated Nov. 18, 2016 issued in Application No. 13190270.
United States Office Action dated Aug. 30, 2017, issued in co-pending U.S. Appl. No. 15/248,826.
U.S. Appl. No. 15/248,771, filed Aug. 26, 2016.
U.S. Appl. No. 15/248,826, filed Aug. 26, 2016.
Chinese Office Action dated Apr. 18, 2018 issued in Application No. 201610586644.2 (with English Translation).
Chinese Office Action dated May 9, 2018 issued in Application No. 201610586651.2 (with English Translation).
Korean Notice of Allowance dated May 31, 2018 issued in Application No. 10-2013-0106870 (with English Translation).
U.S. Office Action dated Jun. 26, 2018 issued in U.S. Appl. No. 15/248,771.

* cited by examiner

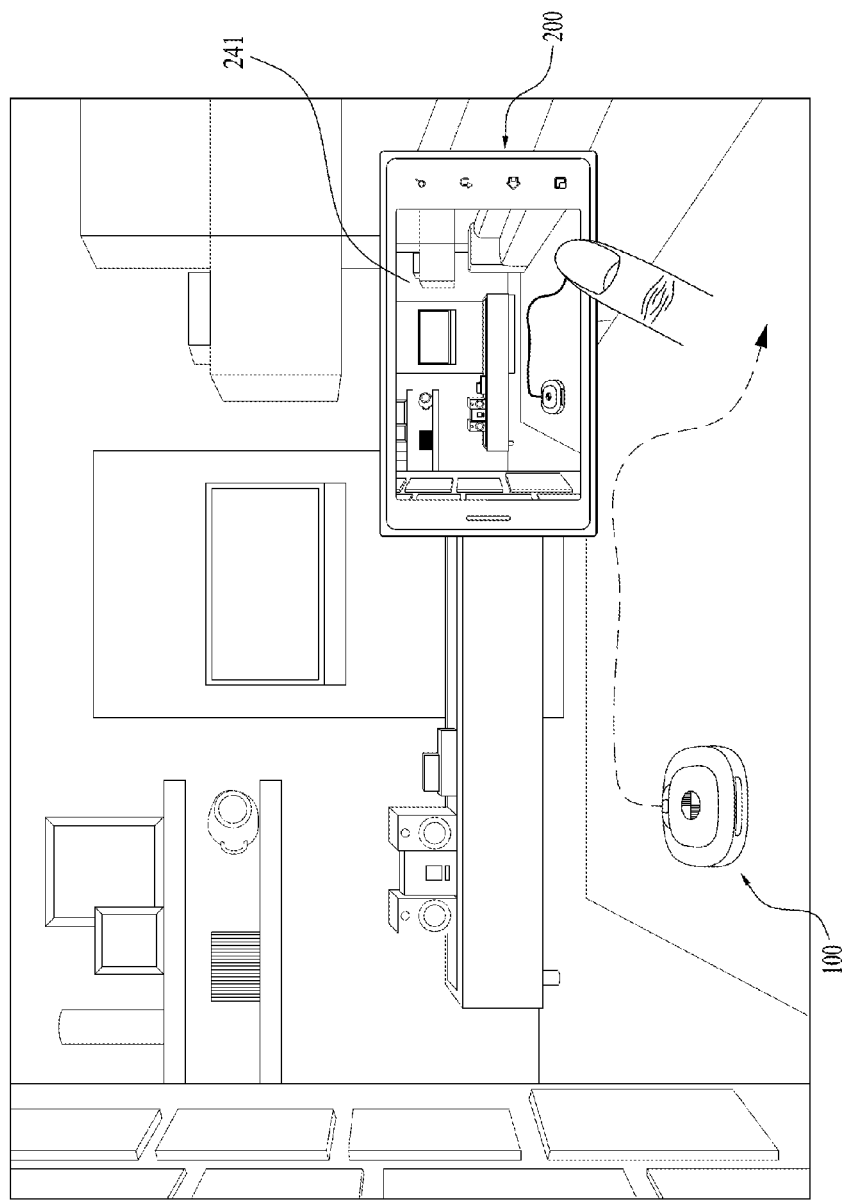

ROBOT CLEANER SYSTEM AND CONTROL METHOD OF THE SAME

CROSS-REFERENCE TO RELATED APPLICATIONS

This application is a Continuation Application of U.S. patent application Ser. No. 14/062,633, filed Oct. 24, 2013 (now U.S. Pat. No. 9,675,226 issued Jun. 13, 2017), which claims priority under 35 U.S.C. § 119 to Korean Application 10-2012-0119843 filed on Oct. 26, 2012 and Korean Application 10-2013-0106870 filed on Sep. 5, 2013, whose entire disclosures are hereby incorporated by reference. This application relates to co-pending U.S. patent application Ser. No. 15/248,826, filed Aug. 26, 2016 and U.S. patent application Ser. No. 15/248,771, filed Aug. 26, 2016.

BACKGROUND

1. Field

This relates to a robot cleaner and a control method of the same.

2. Background

A vacuum cleaner may be, for example, a manual vacuum cleaner directly operated by a user, or a robot cleaner that performs cleaning on its own, without manual user operation. A robot cleaner may clean a floor or a carpet of a room. Such a robot cleaner may include an air suction device provided in a cleaner case, the air suction device including a motor and a fan. After driving the air suction device and sucking in external air containing foreign matter, the robot cleaner may separates the foreign matter from the air and exhaust clean air.

BRIEF DESCRIPTION OF THE DRAWINGS

The embodiments will be described in detail with reference to the following drawings in which like reference numerals refer to like elements wherein:

FIG. 8 illustrates a method for generating image information of a robot cleaner in a robot cleaner system, in accordance with embodiments as broadly described herein;

DETAILED DESCRIPTION

Figure 1:
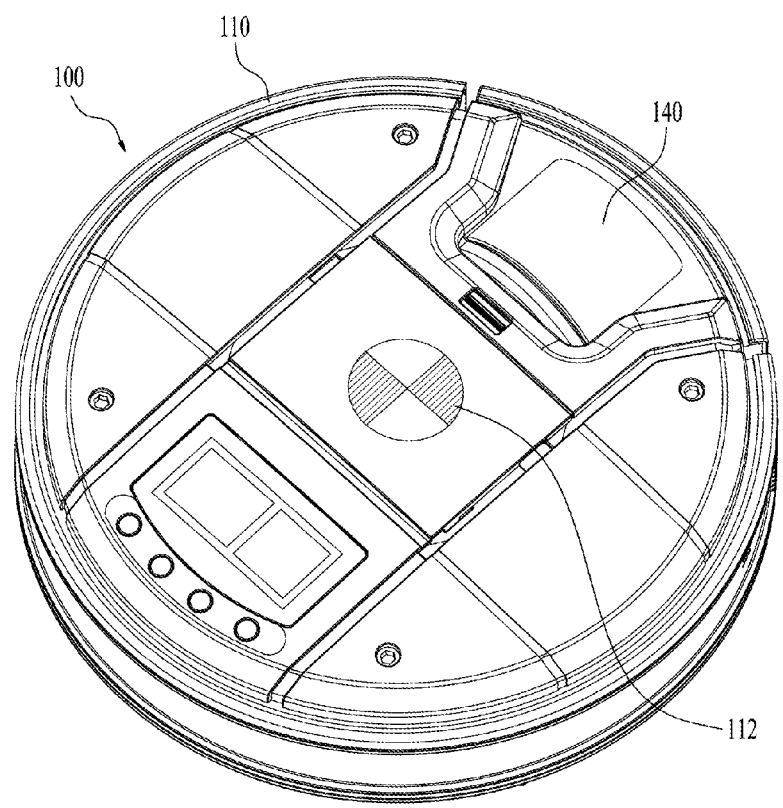
FIG. 1 is a perspective view of a robot cleaner according to one embodiment as broadly described herein.
Figure 2:
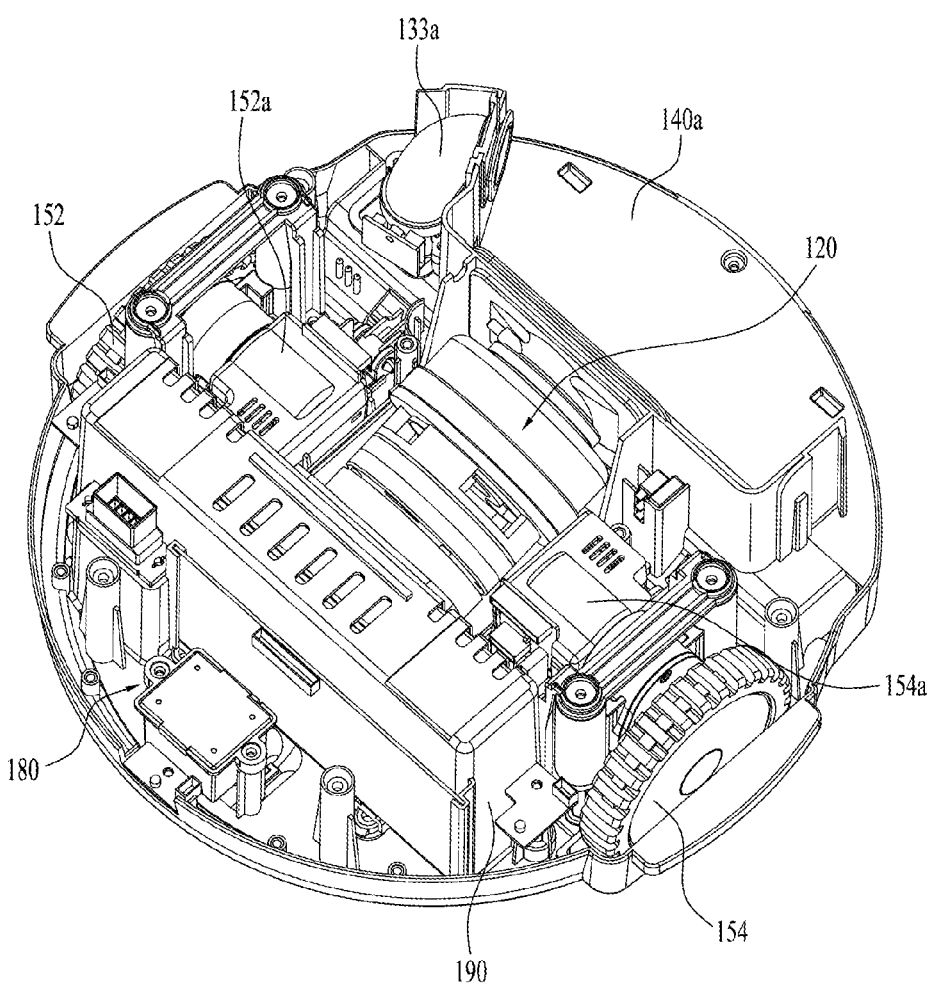
FIG. 2 is a perspective view of an inner structure of the robot cleaner shown in FIG. 1.
Figure 3:
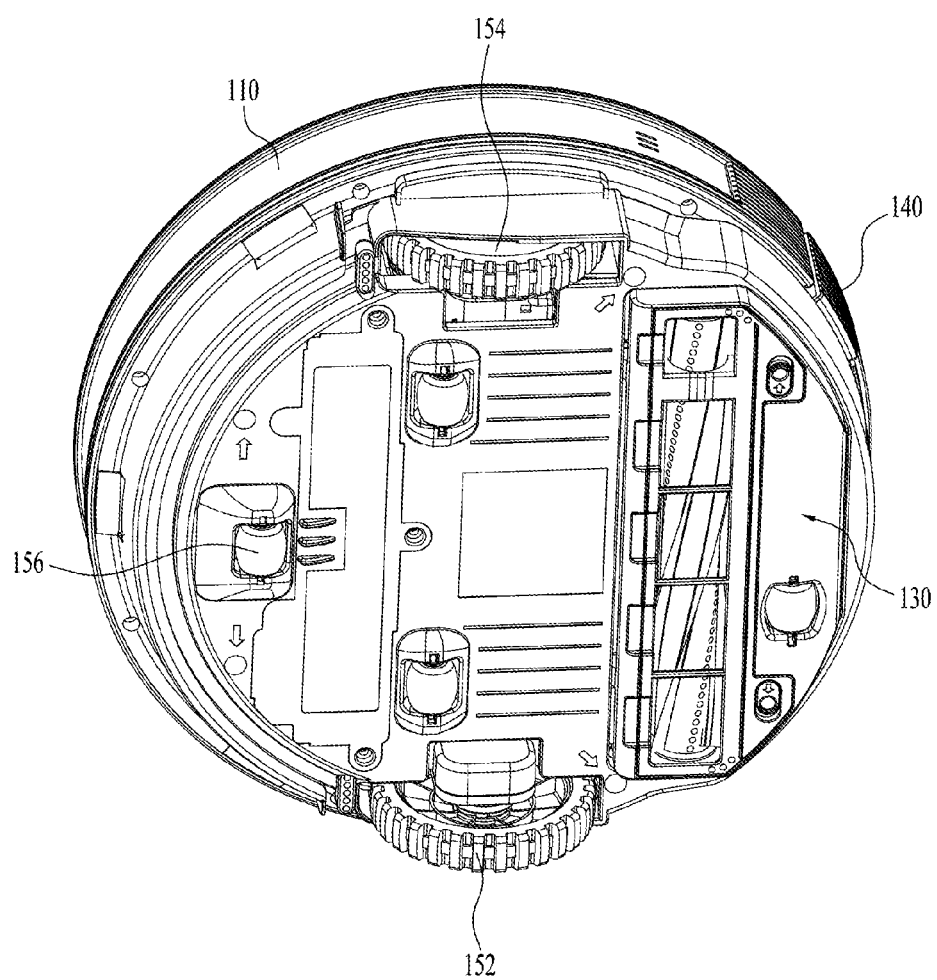
FIG. 3 is a lower perspective view of the robot cleaner shown in FIG. 1.

Exemplary embodiments are described more fully hereinafter with reference to the accompanying drawings. The disclosed subject matter may, however, be embodied in many different forms and should not be construed as limited to the exemplary embodiments set forth herein. Exemplary embodiments may be described herein with reference to cross-region illustrations that are schematic illustrations of idealized embodiments (and intermediate structures) of the disclosed subject matter. As such, variations from the shapes of the illustrations as a result, for example, of manufacturing techniques and/or tolerances, may be expected. Thus, exemplary embodiments should not be construed as limited to the particular shapes of regions illustrated herein but may include deviations in shapes that result, for example, from manufacturing.

A robot cleaner may suck foreign matter (e.g., dust) from the floor in a set region to be cleaned, while maneuvering through the region, or may perform cleaning automatically using an obstacle sensor, or while being manually driven via a remote control device wirelessly linked to the robot cleaner. However, without an element for precisely measuring a relative position between the user and the robot cleaner, a location of the robot cleaner may be difficult to detect. In addition, when the robot cleaner is manually operated, passage direction of the robot cleaner may be changed via a direction key provided on a remote control device in real time. Delayed response to such changes may cause user inconvenience, and imprecise operation of the robot cleaner. Wireless operation of the robot cleaner may be performed while the user is watching the robot cleaner, but may require that the user and the robot cleaner be located in the same portion of a cleaning region to enable the wireless operation of the robot cleaner. Accordingly, even though wireless control may be available, the user may tend to employ only an auto-clean mode.

A robot cleaning system according to an embodiment as broadly described herein may include a robot cleaner 100 configured to perform cleaning, while being automatically driven, and a remote control device 200 configured to remotely control the robot cleaner 100.

The remote control device 200 may include a camera 221' to generate image information for the robot cleaner 100 and a region near the robot cleaner 100. The remote control device 200 may generate location information about the robot cleaner 100 based on the image information. Specifically, a region displayed on the remote control device 200 may be mapped with an actual cleaning region based on the image information.

Referring to FIGS. 1-4. the robot cleaner 100 may include a cleaner case 110 that defines an exterior appearance of the robot cleaner 100, a suction device 120 provided in the cleaner case 110, a suction nozzle 130 configured to suck dust on the floor via the driving of the suction device 120 and a dust collector 140 configured to collect foreign matter from the sucked air.

The cleaner case 110 of the robot cleaner 100 may be formed in a cylinder shape with a relatively smaller height than a diameter, in other words, a flat cylinder shape. It may have a square shape with circular corners.

In an outer circumferential surface of the cleaner case 110 may be provided a sensor configured to sense a distance to a wall or an obstacle in a room, a bumper configured to damp a shock generated by collision and wheels 150 configured to move the robot cleaner 100.

The wheels 150 may include a left driving wheel 152 and a right driving wheel 154 which are installed at two opposite lower portions of the cleaner case 110, respectively. The left and right driving wheels 152 and 154*a* re configured to be rotated by a left wheel motor 152*a* and a right wheel motor 154*a* controllable by a cleaner controller 160, respectively, such that the robot cleaner 100 can change a direction in accordance with the driving of the left and right wheel motors 152*a* and 154*a* automatically, while performing a cleaning operation.

At least one auxiliary wheel 156 may be provided in a bottom of the cleaner case 110 and the auxiliary wheel 156 may minimize friction between the robot cleaner 100 and the floor and guide the motion of the robot cleaner 100 simultaneously.

Moreover, a recognition device may be provided in the cleaner case 110 to map an actual region in which the robot cleaner is located, and a virtual region. Also, the recognition device may be various types with various shapes and it may be provided in the cleaner case 110 or on an outer surface of the cleaner case 110. In other words, the recognition device may be recognized via a camera outside the robot cleaner 100.

In FIG. 1, a recognition mark 112 is shown as one example of the recognition device. The recognition mark 112 may be provided, for example, on an upper surface of the cleaner case 110 and it may have various patterns. Also, a position of the recognition device may be changed in various ways and the number of the positions may be changeable. The recognition device may allow the actual region where the robot cleaner 100 is located to be mapped with the virtual region in an external device. For example, the actual region where the robot cleaner 100 is located may be mapped with a virtual region displayed on the external device, which will be described specifically later.

Figure 4:
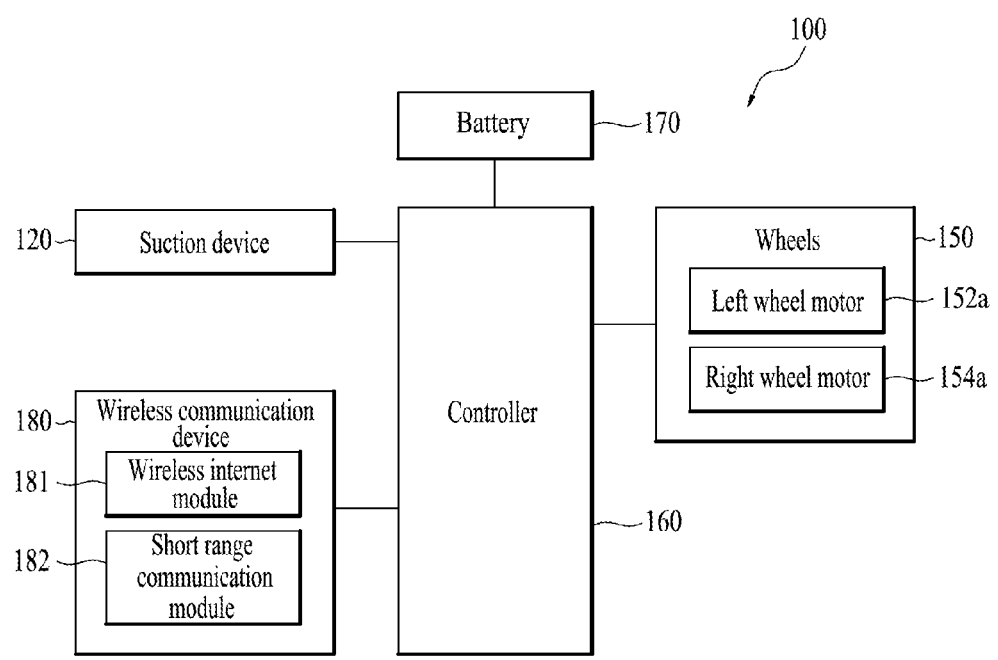
FIG. 4 is a block diagram of a robot cleaner of a robot cleaner system according to one embodiment as broadly described herein.

As shown in FIG. 4, the cleaner controller 160 may be linked to various components of the robot cleaner 100 to control the driving of the robot cleaner 100, and may be provided in the cleaner case 110, for example, a front portion inside the case 110. Also, a battery 170 configured to supply a power to the suction device 120 may be provided in the cleaner case 110, for example, a rear portion inside the case 110.

The suction device 120 configured to generate an air suction force may be provided behind the battery 170 and the dust collector 140 may be detachably coupled to a rear portion of a dust collector coupling part provided in a rear portion of the suction device 120.

The suction nozzle 130 may be provided under the dust collector 140 and it may draw in foreign matter with air from the surface to be cleaned. The suction device 120 may include a fan installed at an incline between the battery 170 and the dust collector 140, and connected to a motor that is electrically connected to the battery 170 and a shaft of the motor to blow air.

The suction nozzle 130 may be exposed to a bottom of the cleaner case 110 via a hole formed in the bottom of the cleaner case 110, to allow for contact with the floor of the room.

To control the robot cleaner 100 from a distance, the robot cleaner 100 according to this embodiment may include a first wireless communication device 180 that can wirelessly communicate with an external device.

The first wireless communication device 180 may include one or more modules that enable the robot cleaner 100 to wirelessly communicate with an external device or an external network. For example, the first wireless communication device 180 may include a wireless internet module 181 and a short range communication module 182.

The wireless internet module 181 may provide for wireless internet link and it may be an internal element or an external element of the robot cleaner 100. Examples of wireless internet technologies may include WLAN (Wireless LAN) (Wi-Fi), WiBro (Wireless Broadband), WiMax (World Interoperability for Microwave Access) and HSDPA (High Speed Downlink Packet Access).

The short range communication module 182 may provide for short range communication. Examples of short range communication may include Bluetooth, RFID (Radio Frequency Identification), IrDA (Infrared Data Association and UWB (Ultra Wideband Zigbee).

Next, referring to FIGS. 5, 6 and 7, an example of the remote control device 200 of the robot cleaner system will be described.

Figure 5:
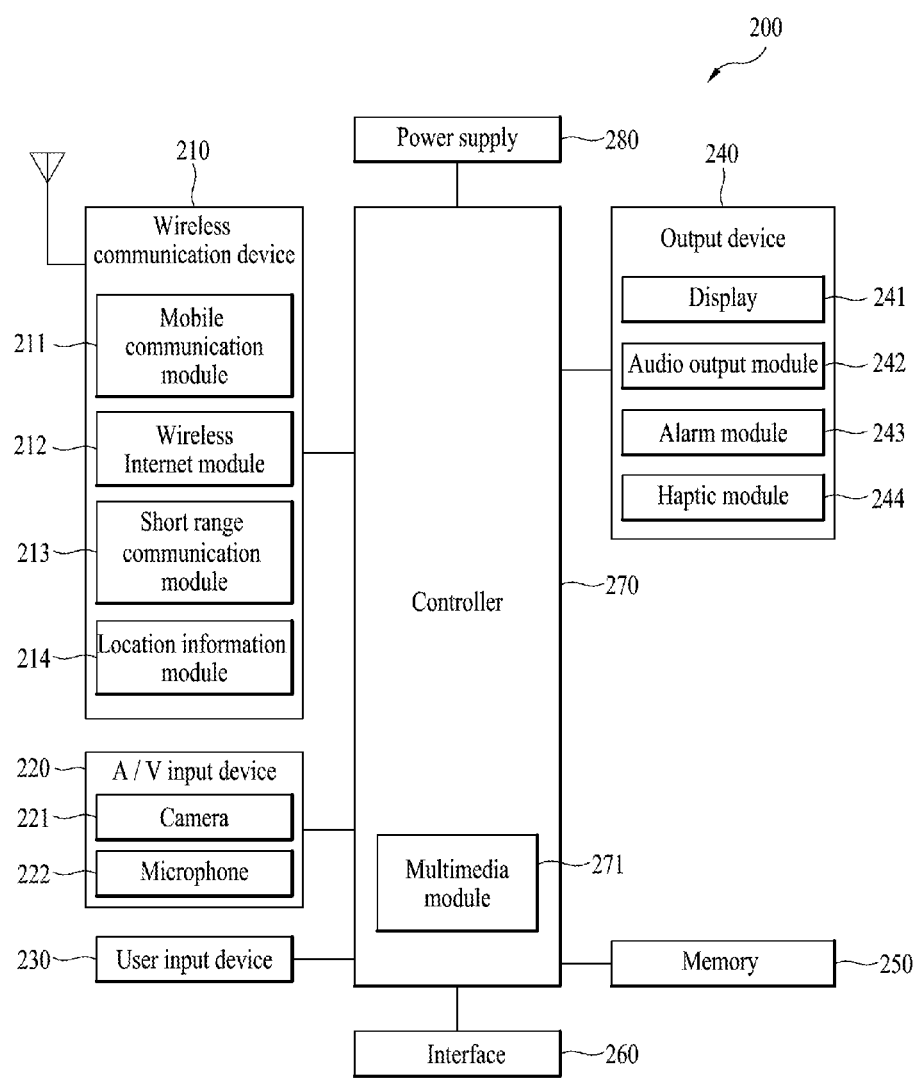
FIG. 5 is a block diagram of a remote control device of the robot cleaner system according to one embodiment as broadly described herein.

FIG. 5 is a block diagram of the remote control device 200 of the robot cleaner system according to one embodiment as broadly described herein.

The remote control device 200 may provide for remote access to the robot cleaner 100 to control the driving of the robot cleaner 100. Examples of the remote control device may include a smart phone, PDA (Personal Digital Assistant) and PMP (Portable Multimedia Player).

For convenient explanation, a smart phone will be considered hereinafter as the remote control device 200 of the robot cleaner 100.

The remote control device 200 may include a wireless communication device 210, AV (Audio/Video) input device 220, a user input device 230, an output device 240, a memory 250, an interface 260, a terminal controller 270 and a power supply 280. The components shown in FIG. 5 are not necessarily provided and a remote control device 200 having more or less components may be realized.

Each of the components will be described in order.

The wireless communication device 210 (a second wireless communication device) may include one or more modules that enables wireless communication between wireless communication systems or wireless communication between the remote control device 200 and a network in which the remote control device 200 is located. For example, the second wireless communication device 210 may include a mobile communication module 211, a wireless internet module 212 and a short range communication module 213.

The mobile communication module 211 transmits and receives a wireless signal to and from one or more of a base station, an external terminal a server on a mobile communication network. Such a wireless signal may include various types of data in accordance with transmission/receiving of a voice call signal, a video call signal or a texture/multimedia message.

The wireless internet module 212 may provide for wireless internet link and it may be an internal or external element of the remote control device 200. Examples of wireless internet technologies may include WLAN (Wireless LAN) (Wi-Fi), WiBro (Wireless Broadband), WiMax (World Interoperability for Microwave Access) and HSDPA (High Speed Downlink Packet Access).

The short range communication module 213 may provide for short range communication. Examples of short range communication may include Bluetooth, RFID (Radio Frequency Identification), IrDA (Infrared Data Association and UWB (Ultra Wideband Zigbee).

Referring to FIG. 5, the A/V input device 220 is for inputting an audio signal or a video signal and it may include a camera 221 and a microphone 222. The camera 221 processes image frames of a video file or a still image gained by an image sensor in a video call mode or camera mode. The processed image frame may be displayed on a display 241.

The image frame processed by the camera 221 may be stored in the memory 250 or transmitted to an external device via the second wireless communication device 210. Two or more cameras 221 may be provided in accordance with a service environment.

The microphone 222 converts an external audio signal received from the outside into electric voice data in a call or record mode and a voice recognition mode. In the call mode, the processed voice data may be converted into a transmittable signal and output to a mobile communication base station by the mobile communication module 211. In the microphone 222 may be realized various types of noise rejection algorithms for reflecting the noise generated while receiving the external audio signal.

The user input device 230 generates data for the user to control the operation of the remote control device 200. The user input device 230 may include a key pad, a dome switch, a touch pad (static pressure/capacitive type), a jog wheel and a jog switch.

The output device 240 may generate output associated with visual, auditory or tactual sense. The output device 240 may include a display 241, an audio output module 242, an alarm module 243 and a haptic module 244.

The display 241 displays, in other words, outputs the information processed in the remote control device 200. For example, the display 241 may display UI (User Interface) or a GI (Graphic User) interface associated with a call when the remote control device 200 is in a call mode. When the remote control device 200 is a video call mode or a camera mode, the display 241 may display photographing and/or received image or UI and GUI.

The display 241 may include at least one of a liquid crystal display (LCD), a thin film transistor liquid crystal display (TFT LCD), an organic light emitting diode (OLED), a flexible display or a 3D display.

Two or more displays 241 may be provided in accordance with a realizing type of the remote control device 200. For example, a plurality of displays 241 may be arranged in one surface at intervals or integrally, or they may be arranged in different surfaces, respectively.

When the display 241 and a sensor for sensing touch input (hereinafter, 'a touch sensor') form a layer structure (hereinafter, 'a touch screen'), the display 241 may be used as an input device as well as an output device. The touch sensor may have a touch film, a touch sheet and a touch pad.

The touch sensor may be configured to convert a pressure applied to a specific point of the display 241 or change in capacitances generated in a specific point into an electric input signal. The touch sensor may detect a position of input touch and an area of the input touch. Also, it may detect a pressure applied in the touch input.

When the touch input is sensed by the touch sensor, a signal(s) corresponding to the touch may be transmitted to a touch controller. The touch controller processes the signal(s) and transmits data corresponding to the signal(s) to the terminal controller 270. After that, the terminal controller 270 may the terminal controller 270 may determine which point is touched on the display 241.

The audio output module 242 may output audio data received from the second wireless communication device 210 or stored in the memory 250 in call signal receiving, a call or record mode, a voice recognizing mode and a broadcasting receive mode. The audio output module 242 may output an audio signal associated with functions performed by the remote control device 200 (e.g., a call signal receiving sound and a message receiving sound). Such an audio output module 242 may include a receiver, a speaker and a buzzer.

The alarm module 243 outputs signal for notifying event generation of the remote control device 200. Examples of the event generated in the remote control device 200 may include call signal receiving, message receiving, key signal input and touch input. The alarm module 243 may also output another type signal rather than the video or audio signal. The alarm module 243 may output a vibration signal for notifying the event generation. The video or audio signal may be output even via the display 241 or the audio output module 242 and both of the display 241 and the audio output module 242 may be categorized as the alarm module 243.

The haptic module 244 generates various tactile or haptic effects sensed by the user. A typical example of the haptic effects generated by the haptic module 244 may be vibration. Intensity and a pattern of the vibration generated by the haptic module 244 may be controllable. For example, different vibrations may be compounded and output or they may be sequentially output.

The memory 250 may store a program for operating the terminal controller 270 or temporarily store input/output data (e.g., a phone book, a message, a still image and a motion picture) therein. The memory 250 may store various patterned vibrations and sounds output after the touch input.

The memory 250 may include at least one of storage medium including a flash memory type, a hard disk type, a multimedia card micro type, a card type memory (e.g., a SD or XD memory), RAM (Random Access Memory), SRAM (static Random Access Memory), PROM (Programmable Read-Only Memory), MRAM (Magnetic Random Access Memory), a magnetic disk and an optical disk. The remote control device 200 may be operated in association with a web storage performing a storage function of the memory 250 on the internet.

The interface device 260 may be employed as a passage to all of the external devices connected with the remote control device 200. The interface 260 may be provided with data and/or power by the external devices and may transmit the data and/or power to each of the elements or transmit data of the remote control device 200 to the external device. For example, the interface 260 may include a wire/wireless headset port, an external charger port, a wire/wireless data port, a memory card port, a port for connecting a device having an identity module, an audio I/O (Input/output) port, a video I/O port and an earphone port.

The identity module is a chip storing a variety of information therein to identify an authority for use of the remote control device 200. The identification module may include SIM (Subscriber Identity Module) and USIM (Universal Subscriber Identity Module). A device having the identity module (hereinafter, "identity device") may be fabricated to be a smart card. Accordingly, the identity device may be connected to the remote control device 200 via a port.

The terminal controller 270 typically controls an overall operation of the remote control device 200. For example, the terminal controller 270 performs control and process associated with voice call, data communication and video call. The terminal controller 270 may include a multimedia module 271 for playing multimedia. The multimedia module 271 may be realized in the terminal controller 270 or separately realized.

The terminal controller 270 may process pattern recognition for recognizing handwriting input or drawing input performed on a touch screen as characters and images.

The power supply 280 may be provided with an external power or internal power in accordance with the control of the controller 270 and supply a power required by the operation of the components.

The embodiment of the present disclosure may be realized in a computer or readable media similar to the computer, using a software, a hardware or combination of the software and the hardware.

In hardware realization, the embodiments described herewith may be realized by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, microprocessors and electric units for performing other functions. In some cases, the embodiments may be realized by the terminal controller 270.

In software realization, embodiments such as processes and functions may be realized together with an auxiliary software module performing one or more functions or operations. A software code may be realized by a software application written in a proper program language. The software code may be stored in the memory 250 and performed by the terminal controller 270.

Figure 6:
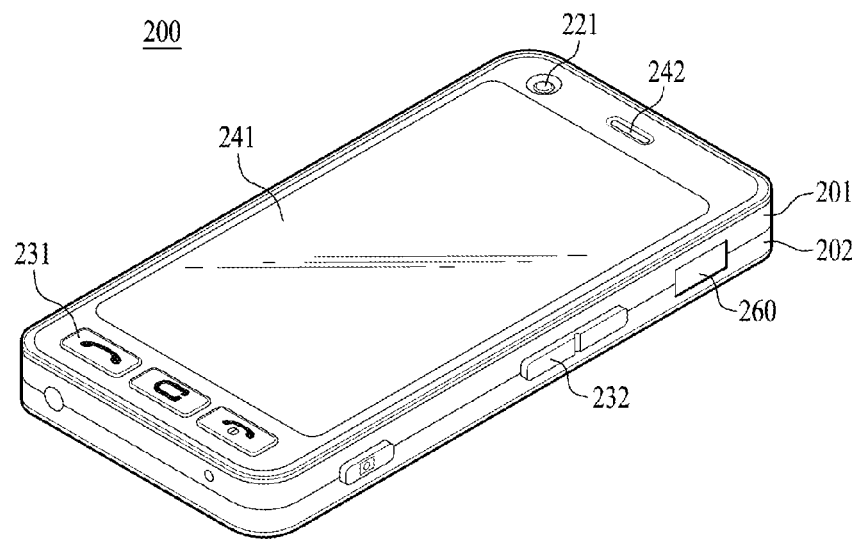
FIG. 6 is a front perspective view of the remote control device shown in FIG. 5.

FIG. 6 is a front perspective view of the remote control device.

The remote control device 200 described above includes a bar-shaped body, but the embodiments are not limited thereto. The remote control device may be a slide type, a folder type, a swing type and a swivel type, with two or more bodies relative-movably coupled to each other.

The body includes a case (e.g., a casing, a housing and a cover) for defining an exterior appearance of the remote control device 200. In this embodiment, the case may be divided into a front case 201 and a rear case 202. Various electronic components are mounted in a space formed between the front case 201 and the rear case 202. One or more intermediate cases may be additionally arranged between the front case 201 and the rear case 202.

The cases may be injection-molded of synthetic resin or they may be formed of a metallic material (e.g., stainless steel (STS) and titanium (Ti)).

In the body of the remote control device 200, mainly, in the front case 201 may be arranged the display 241, the audio output module 242, the camera 221, the input device 230, specifically, input devices 231 and 232, the microphone 222 and the interface 260.

The display 241 occupies most of a main surface of the front case 201. The audio output module 242 and the camera 221 may be arranged adjacent to one of the two ends of the display 241. The input device 231 and the microphone 222 may be arranged adjacent to the other end. The input device 232 and the interface 260 may be arranged in lateral surfaces of the front and rear cases 201 and 202.

The user input device 230 may be operated by the user to receive an input command for controlling the operation of the remote control device 200. The user input device 230 may include a plurality of manipulating devices 231 and 232. The manipulating devices 231 and 232 may be collectively referred to as a manipulating portion. Any tactile manners in which the user manipulates, with a tactile sense may be applied.

The contents input by the first or second manipulating devices 231 and 232 may be set in various manners. For example, the first manipulating device 231 receives an input command (e.g., a start command, an end command and a scroll command). The second manipulating device 232 may receive an input command (e.g., controlling of a sound output from the audio output module 242 and conversion into a touch recognition mode of the display 241).

Figure 7:
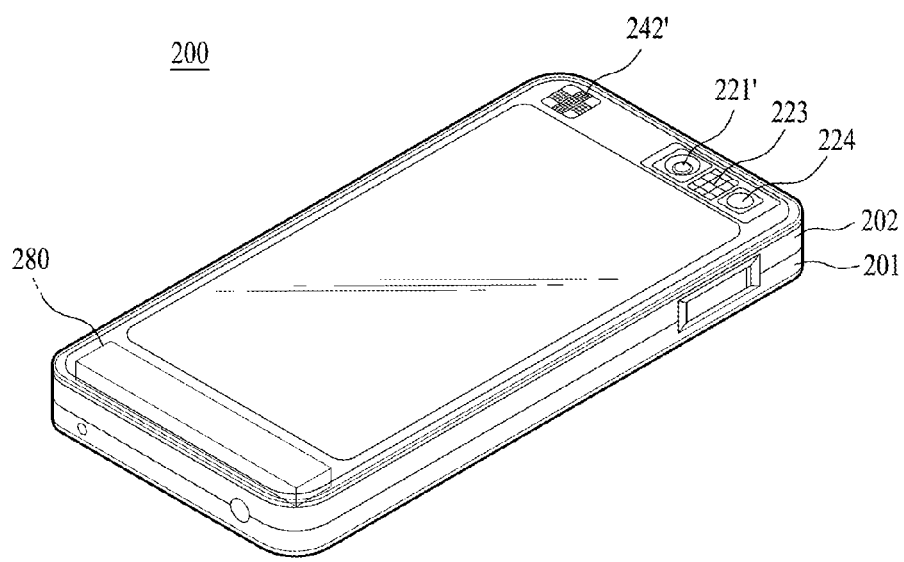
FIG. 7 is a rear perspective view of the remote control device shown in FIGS. 5 and 6.

FIG. 7 is a rear perspective diagram of the remote control device 200.

Referring to FIG. 7, another camera 221' may be additionally mounted in a rear surface of the body of the remote control device 200, in other words, in the rear case 202. The camera 221' may have a photographing direction substantially opposite to a photographing direction of the camera 221 shown in FIG. 6 and it may have different pixel capacity from that of the camera 221.

For example, the camera 221 may have a relatively low pixel capacity, which causes no problems in transmitting a photograph of the user's face to opponent recipient on a video call. The camera 221' may have a relatively high pixel capacity because it is often not to transmit a conventional object immediately after photographing. The camera 221' may be coupled to the body of the remote control device 200 with rotatable or being able to pop up.

A flash 223 and a mirror 224 may be additionally arranged adjacent to the camera 221'. The flash 223 flashes a light upon an object when the camera 221' photographs an object. The user may reflect the face in the mirror 224 when trying to photograph himself or herself (in other words, self-photograph).

Another audio output module 242' may be arranged in a rear surface of the body of the remote control device 200. The audio output module 242' may realize a stereo function, together with the audio output module 242 shown in FIG. 6.

The audio output module 242' may be used in realizing a speaker phone during the call.

A power supply unit 280 may be mounted to the body of the remote control device 200 to supply a power to the remote control device 200. The power supply 280 may be mounted in the body of the remote control device 200 or directly and detachably coupled to an outer surface of the body possessed by the remote control device 200.

FIG. 8 illustrates a method for generating image information of a robot cleaner in the robot cleaner system according to one embodiment as broadly described herein, and FIGS. 9A-9D illustrate a method for generating location information of a robot cleaner in the robot cleaner system.

As mentioned above, the robot cleaner system according to one embodiment includes the remote control device 200 so as to control the driving of the robot cleaner 100 from a distance. However, for the remote control device 200 to control the driving of the robot cleaner 100, information on a precise location of the robot cleaner 100 may be provided. Specifically, an actual region and a virtual region may be mapped with each other.

To address this need, location information of the robot cleaner 100 may be generated by sensing the robot cleaner 100 based on the image information generated via the camera 221' of the remote control device 200.

First of all, the camera 221' provided in the rear surface of the remote control device 200 photographs the robot cleaner 100 and a region near the robot cleaner 100, to generate image information. The generated image information of the robot cleaner 100 is transmitted to the terminal controller 270.

Hence, the remote control device 200 may map an actual region where the robot cleaner 100 is located with a virtual region displayed as the image information, based on the image information, as shown in FIG. 8. That means that the remote control device 200 senses the robot cleaner 100.

Figure 9A:
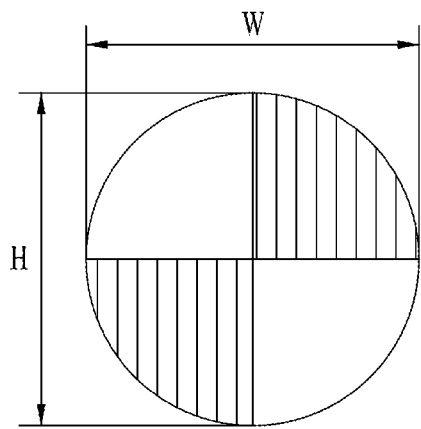
FIG. 9A illustrates a recognition mark provided in the robot cleaner.

As mentioned above, the recognition mark 112 allowing the external device to sense the robot cleaner 100 may be provided on the upper surface of the robot cleaner 100 (see FIG. 1). The shape of the recognition mark 112 is not limited to specific shapes and/or patterns. For example, the recognition mark 112 may be formed in a circular shape as shown in FIG. 9A. In this instance, the width (W) and the height (H) of the recognition mark 112 have substantially the same value.

An actual shape of the recognition mark 112 is stored in the memory 250 of the remote control device 200. In other words, information on the recognition mark 112 (e.g., the actual size of the recognition mark 112) is stored in the memory 250. The terminal controller 270 may extract the recognition mark 112 on an image of the image information and determine whether the extracted recognition mark 112 is available, such that the robot cleaner 100 can be sensed based on the result of the determination.

The terminal controller 270 may check a shape, a pattern or a specific color of the recognition mark 112, to extract the recognition mark 112 on the image of the image information.

However, in a case in which the image information has poor image quality, it is difficult for the terminal controller 270 to sense the recognition mark 112. The terminal controller 270 may improve the image quality of the image information before extracting the recognition mark 112 from the image information.

The terminal controller 270 may perform image brightness control, noise rejection and color correction to improve the image quality of the image information.

After that, the remote control device 200 may compare information on an actual shape of the recognition mark 112 with a relative shape figured out by the image information and generate the location information of the robot cleaner 100 based on the result of the comparison. In other words, mapping between the actual region and the virtual region may be performed.

When the user photographs the robot cleaner 100 and a region near the robot cleaner 100, using the camera 221' of the remote control device 100, the user may photograph the robot cleaner 100 and the region in a state of raising the remote control device 200 to a predetermined height. In other words, the user takes a picture while looking down on the robot cleaner 100.

Figure 9B:
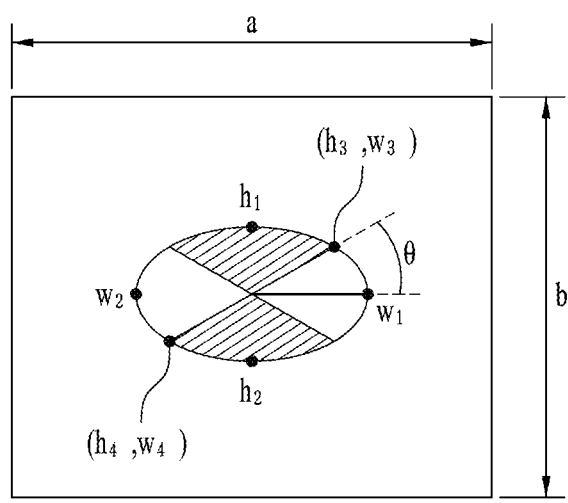
FIG. 9B illustrates a recognition mark recognized on an image of the image information.

Accordingly, a height of the recognition mark 112 provided on the robot cleaner 100 may appear to be smaller than the width on the image of the image information in accordance with an angle at which the user is looking down on the robot cleaner 100 as shown in FIG. 9B.

The relative shape and size of the recognition mark 112 extracted from the image information may be changed in accordance with a posture of the robot cleaner 100 and a distance between the robot cleaner 100 and the remote control device 200. The actual shape and size of the recognition mark 112 extracted from the image information may be changeable in accordance with the posture of the robot cleaner 100 and a distance between the robot cleaner 100 and the remote control device 200.

The actual shape of the recognition mark 112 is different from the relative shape extracted from the image information, corresponding to the location and posture of the robot cleaner 100. Accordingly, the actual shape of the recognition mark 112 is compared with the relative shape extracted from the image information and the location and posture of the robot cleaner 100 may be figured out based on the result of the comparison. Also, a distance between the user and the robot cleaner 100 and a photographing angle may be figured out. The scale between the virtual region displayed on the image information and the actual region can be figured out.

Next, there will be described a specific method for recognizing the location and posture of the robot cleaner 100 based on the result of the comparison between the actual shape of the recognition mark 112 and the relative shape figured out from the image information or mapping between the virtual region and the actual region.

The following mathematical formulas, or equations, may be used in recognizing the location and posture of the robot cleaner 100 from the relative shape of the recognition mark 112.

$$v = c \times \left(\frac{\Delta w}{a}\right) \quad \text{Equation 1}$$

c: camera horizontal view angle
 i. $\Delta w$: w1-w3[pixel]
 ii. a: image vertical photograph resolution [pixel]

$$L = W/\tan(v) \quad \text{Equation 2}$$

ii.
 a. L: distance between robot cleaner and remote control device
 b. W: actual width [mm] of robot cleaner
 c. V: view angle corresponding to $\Delta w$ $$u = \sin^{-1}\left(\frac{\Delta h}{\Delta w}\right) \quad \text{Equation 3}$$

i. U: elevation angle of remote control device
ii. $\Delta h$: h1-h2 [pixel]
iii. $\Delta w$: w1-w2 [pixel]

$$\theta = \tan^{-1}\left(\frac{h3-h4}{w3-w4}\right) \quad \text{Equation 4}$$

i. $\theta$: azimuth of recognition mark $$\theta_0 = \tan^{-1}\left(\left(\frac{h3-h4}{t}\right)\times\left(\frac{1}{w3-w4}\right)\right) \quad \text{Equation 5}$$

ii. $\theta_0$: compensated azimuth of recognition mark
iii. r: $\Delta h/\Delta w$ (H/W ratio)

Figure 9C:
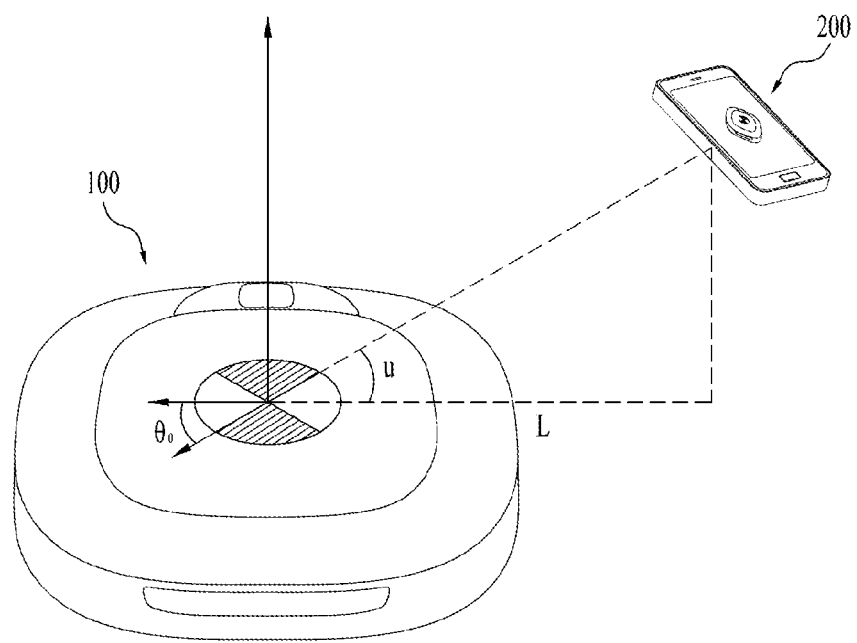
FIG. 9C illustrates location information generation of the robot cleaner using the remote control device.

FIG. 9C illustrates an example of images of the image information generated by the camera 221' of the robot cleaner 100 and the region near the robot cleaner 100. A horizontal photograph resolution of an image is "a" [pixel] and a vertical photograph resolution is "b" [pixel]. A horizontal view angle of the camera 221 is "c°" and it means that an image of the image information has "a*b" resolution and "c°" horizontal view angle.

First of all, the distance between the robot cleaner 100 and the remote control device 200 can be calculated, using Equations 1 and 2.

A horizontal view angle "v°" of the recognition mark 112 may be calculated by using a horizontal view angle "c°", a vertical length "$\Delta h$" [pixel] of the recognition mark 112 on the image of the image information and a horizontal length "$\Delta w$" [pixel] of the recognition mark 112 on the image of the image information, as mentioned in Equation 1.

The calculated horizontal view angle "v°" of the recognition mark 112 is substituted into Equation 2 and a horizontal distance (L) between the robot cleaner 100 and the remote control device 200 is gained as shown in FIG. 9C.

After that, an elevation angle "u°" at which the remote control device 200 is looking down on the robot cleaner 100 may be gained as shown in FIG. 9C, using Equation 3.

Hence, an azimuth of the recognition mark 112 indicating the posture of the robot cleaner 100 may be gained, using Equations 4 and 5.

Figure 9D:
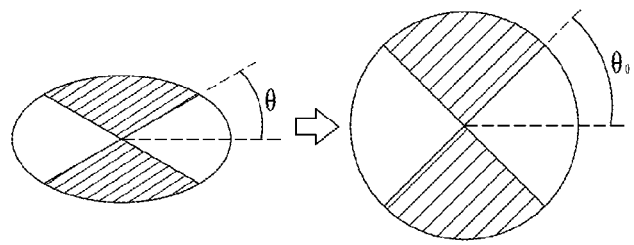
FIG. 9D illustrates a posture of the robot cleaner.

The recognition mark 112 on the image of the image information may have a circular or oval shape with the width ($\Delta w$) larger than the height ($\Delta h$). Accordingly, an azimuth "$\theta$" of the recognition mark 112 on the image of the image information shown in FIG. 9d is the same as or smaller than an azimuth "$\theta 0$" of the actual recognition mark 112. In other words, when the elevation angle of the remote control device 200 is 90°, $\theta=\theta 0$ and when the elevation angle is less than 90°, $\theta<\theta 0$.

Accordingly, r(H/W ratio) is applied to Equation 4 for calculating a relative azimuth "$\theta$" figured out from the image of the image information, such that Equation 5 for calculating the actual azimuth "$\theta 0$". As a result, the actual azimuth "$\theta 0$" of the recognition mark 112 is calculated and a current posture of the robot cleaner 100 is then figured out.

In the robot cleaner 100 as embodied and broadly described herein, the robot cleaner 100 including the recognition mark 112 may be sensed by the remote control device 200 including the camera 221' and also the location information of the robot cleaner 100 indicating the location and the posture of the robot cleaner 100 may be generated.

Meanwhile, it is assumed that the robot cleaner 100 is driving on a plane surface. Specifically, the actual cleaning region is shown on the plane and a virtual region having a different scale from such the actual cleaning region may be shown, such that the actual cleaning region and the virtual region may be mapped with each other based on the mathematical formulas mentioned above.

The location information of the robot cleaner 100 may be displayed on the display 241 provided in the remote control device 200 and a location base service of the robot cleaner 100 may be provided to the user based on the location information. In other words, various types of location based services may be provided by mapping between the virtual region and the actual region. The location based service of the robot cleaner 100 will be described in detail later.

Meanwhile, in a robot cleaner system according to another embodiment of as broadly described herein, appearance information of the robot cleaner 100 may be stored in a memory of a remote control device 200, not using the recognition mark 112, such that the location information of the robot cleaner 100 may be generated.

Specifically, an actual shape of the robot cleaner 100 is compared with a relative shape figured out by image information. A location and a posture of the robot cleaner 100 may be recognized based on the result of the comparison. This embodiment is essentially the same as the embodiment described above, except the shape information of the robot cleaner 100 may be used in figuring out the location and the posture of the robot cleaner 100. Repeated description of this embodiment is omitted.

FIGS. 10A-10B, 11, 12 and 13 illustrate the location based service of the robot cleaner 100 provided by the robot cleaner system according to one embodiment as broadly described herein.

As mentioned above, the remote control device 200 may generate the image information on the robot cleaner 100 and the region near the robot cleaner 100. Then the remote control device 200 may sense the robot cleaner 100 based on the image information and generate the location information on the robot cleaner 100.

In addition, the display 241 may output image information on the robot cleaner 100 and the region near the robot cleaner 100. Especially, the terminal controller 270 controls the robot cleaner 100 to be selectable on a screen of the display 241 based on the location information on the robot cleaner 100, such that the user may control the driving of the robot cleaner 100 while watching a current state of the robot cleaner 100 via the display 241.

To control the driving of the robot cleaner 100, the remote control device 200 may further include an input mechanism configured to input a control signal of the robot cleaner 100. The microphone 222, the user input device 230 and the display 241 having a touch sensor for sensing a touch input may function as the input mechanism.

When the control signal of the robot cleaner 100 is input to the remote control device 200, the second wireless communication device 210 of the remote control device 200 may transmit the control signal to the first wireless communication device 180 of the robot cleaner 100 such that the robot cleaner 100 can be driven by the cleaner controller 160 in accordance with the control signal.

Next, location based services of the robot cleaner 100 which can be provided via the input mechanism of the remote control device 200 will be described, referring to the drawings.

First of all, a location based service of the robot cleaner 100 which can be provided via a touch input to the display 241 will be described.

Figure 10A:
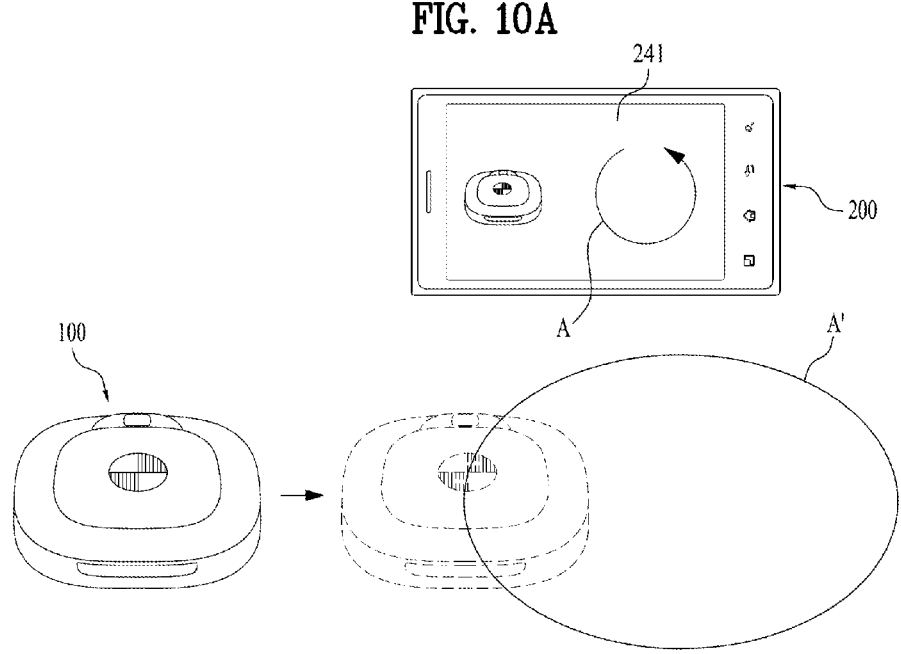
FIG. 10A illustrates a method for setting a cleaning region of the robot cleaner via touch input on a display.
Figure 10B:
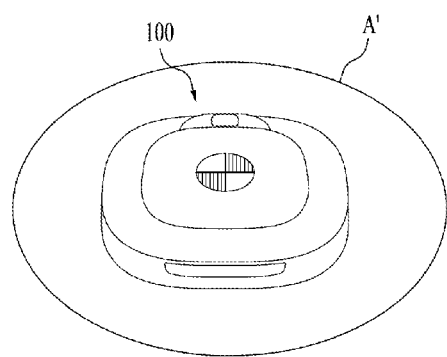
FIG. 10B illustrates a state in which the robot cleaner performs cleaning in a set cleaning region.

For example, a cleaning region of the robot cleaner 100 may be set via touch input. When a virtual region (A) shown in FIG. 10A is designated on the screen of the display 241, the terminal controller 270 designates an actual region (A') of a room corresponding to the virtual region (A) as the cleaning region. Accordingly, the robot cleaner 100 may perform cleaning after moving to the cleaning region as shown in FIG. 10B. In other words, the virtual region displayed on the display 241 may be mapped with the actual region and an actual motion coordinate may be transmitted to the robot cleaner.

For example, if the virtual region (A) designated on the display 241 is a region 5 centimeters distant from a center of the robot cleaner on the display 241 to the right, the actual region (A') may be mapped to a region 1 meter distant from a center of the actual robot cleaner to the right. Such mapping may be performed based on mapping information of comparing an actual shape and size of the recognition device with a relative shape and size of the recognition device on the image information, as mentioned above. Accordingly, the mapping information gained after mapping the virtual region to the actual region may be transmitted to the robot cleaner 100 and the cleaner may perform cleaning based on the mapping information.

Specifically, in one embodiment, a cleaning region may be simply set by a touch input via an image (in other words, a virtual region) of a room output on the display 241. Accordingly, the robot cleaner can perform cleaning only for the region desired to be cleaned and the cleaning time can be reduced. Also, power consumption may be reduced.

Meanwhile, a passage, or path, of the robot cleaner 100 may be set by a touch input. When a passage (B) is designated on a screen of the display 241 shown in FIG. 11, the terminal controller 270 designates a passage (B1) on a room corresponding to the passage (B) as the passage of the robot cleaner 100. Accordingly, the robot cleaner 100 can move to a target point along the designated passage (B1).

In one embodiment, the passage of the robot cleaner 100 may be set by the touch input via the image of the room output on the display 241. Accordingly, the robot cleaner 100 may automatically move along a route set by the user and the delay time which might be generated by changing a moving direction of the robot cleaner in real time via a direction key may be removed.

Together with that, the passage of the robot cleaner may be a curved line and a straight line mixed freely, and it is possible for the user to perform elaborate manipulation.

Figure 12:
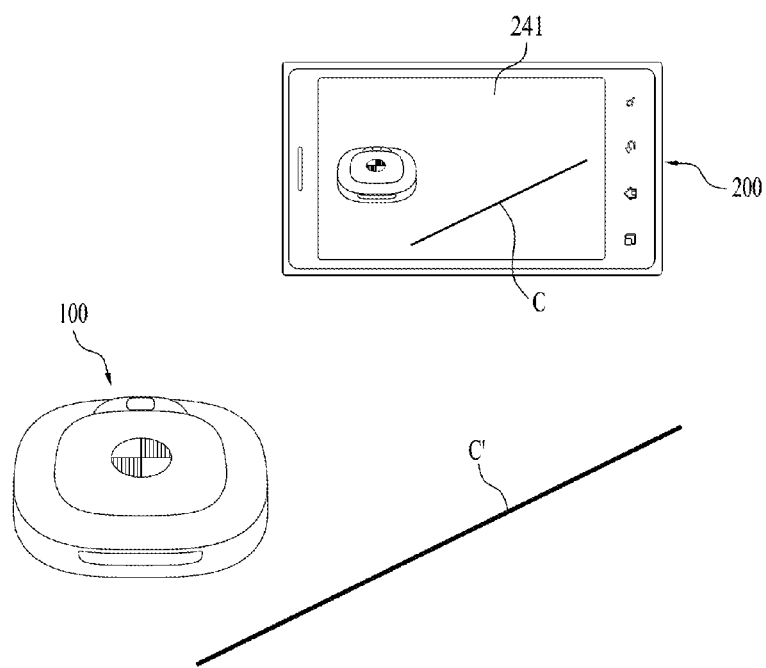
FIG. 12 illustrates a method for setting a do-not clean region of the robot cleaner via touch input on a display.
Figure 13:
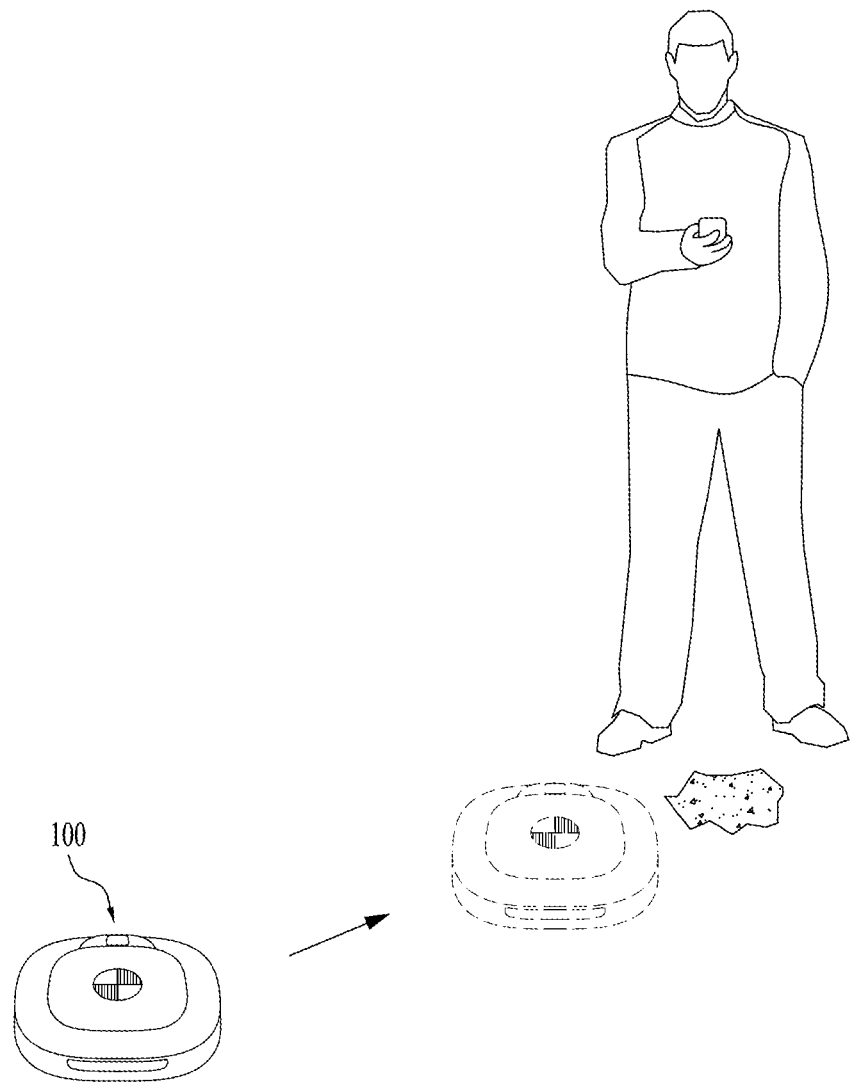
FIG. 13 illustrates a method for calling the robot cleaner to the user's position.

A do-not-clean region of the robot cleaner 100 may be set by a touch input. When a no-cleaning line (C) is designated on the screen of the display 241 as shown in FIG. 12, the terminal controller 270 sets an outer region with respect to partitioning lines (C') on the room corresponding to the no-cleaning line (C) as the do-not clean region. Accordingly, the robot cleaner 100 may perform cleaning only for an inner region with respect to the partitioning lines (C').

In one embodiment, a room may be simply divided through an image of a room output on the display 241 and a do-not clean region may be set. Accordingly, the do-not clean region can be set, without using an auxiliary device (e.g., a Magnet stripe, a virtual wall or the like).

The controlling of the robot cleaner 100 through the touch input may be performed by a medium of the image of the robot cleaner 100 and the region near the robot cleaner 100 output on the display 241, such that the driving of the robot cleaner 100 can be controlled intuitively and elaborately.

Figure 11:
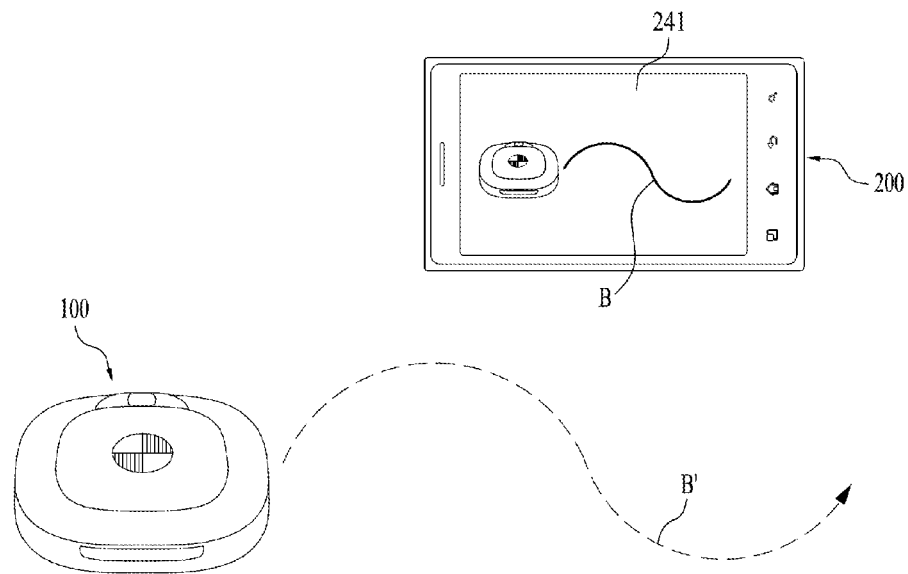
FIG. 11 illustrates a method for setting a passage of the robot cleaner via touch input on a display.

The various location based services provided by the touch input may be performed by selecting an icon of a corresponding service displayed on the screen of the display 241 after a touch input of the corresponding service is applied as mentioned above. For example, when a driving passage shown in FIG. 11 is set on the display 241 and an icon is touched, driving passage information and a driving command may be transmitted to the robot cleaner 100 from the remote control device 200. In this instance, the service may be selected by a voice output from the microphone 222 or by the user input device 230.

Next, an example of a location based service of the robot cleaner 100 which can be provided by a voice input to the microphone 222 will be described.

For example, the robot cleaner 100 may be called to the user's location through a voice input. When the user inputs a preset voice command to the microphone 222 of the remote control device 200, the robot cleaner 100 may move to the location of the remote control device 200, in other words, the user's location based on the location information.

As mentioned above, the robot cleaner may be remote-controlled via the display 241 in accordance with the mapping between an actual region with a virtual region. Accordingly, once the mapping is performed, the user need not watch the actual region or the robot cleaner. Specifically, once the mapping is performed, the user can remote-control the robot cleaner via the display 241 even after moving to other regions. In this instance, wireless communication between the remote control device 200 and the robot cleaner 100 has to be maintained.

Generally, the cleaning region set to be cleaned by the robot cleaner may be fixed. In this instance, the sensing of the robot cleaner performed by the remote control device 200 or the mapping between the actual region and the virtual region may be maintained consistently. Specifically, it is possible to use one sensing or mapping as it is. Accordingly, it is not necessary to photograph the robot cleaner whenever the remote control is performed. When the former photographed image information is stored and the wireless control is performed, the image information may be displayed on the display 241. After that, the wireless control may be repeatedly performed through a virtual region displayed on the display 241. If the environment allows wireless communication between the robot cleaner 100 and the remote control device 200, the user may perform wireless control of the robot cleaner even outside.

For example, the robot cleaner may be connected to a wireless-communication network via WiFi AP in a house. The remote control device 200 held by the user may be wirelessly linked to the robot cleaner through a server and the WiFi AP. Accordingly, the user can wirelessly control the robot cleaner located in the house from outside.

To make such wireless control possible, the robot cleaner 100 has to move to an initial location. In other words, when a photograph is taken, the robot cleaner 100 may move to the initial location of the robot cleaner 100. Accordingly, initial location information (e.g., coordinate information and posture information) may be stored in the robot cleaner. Once the wireless control starts, the robot cleaner may move to the initial location.

The wireless control of the robot cleaner, using the remote control device 200, may simply perform the original cleaning function and additionally please the user. A control method of the robot cleaner according to another embodiment will now be described. Whenever possible, repeated description will be omitted or mentioned briefly and the same numeral references are given to the same components.

The control method of the robot cleaner system according to this embodiment, including the robot cleaner 100 and the remote control device 200 having the camera 221' and the display 241, may include a step of generating image information of the robot cleaner 100 and the region near the robot cleaner using the camera 221, and a step of sensing the robot cleaner 100 based on the image information. The control method may further include a step of generating location information of the robot cleaner 100. In other words, a step of mapping an actual region and a virtual region to each other in accordance with the generated image information may be performed.

A step of outputting the image information and the location information on the display 241 may be performed when generating the image information. After that, a step of providing a location based service may be performed based on the location information.

After initializing the robot cleaner system (S10), image information of the robot cleaner 100 and the region near the robot cleaner may be generated using the camera 221' of the remote control device 200 (S100).

Then, the robot cleaner 100 may be sensed based on the image information (S200). Here, sensing the robot cleaner 100 may be performed by sensing the recognition mark 112 of the robot cleaner 100.

Figure 15:
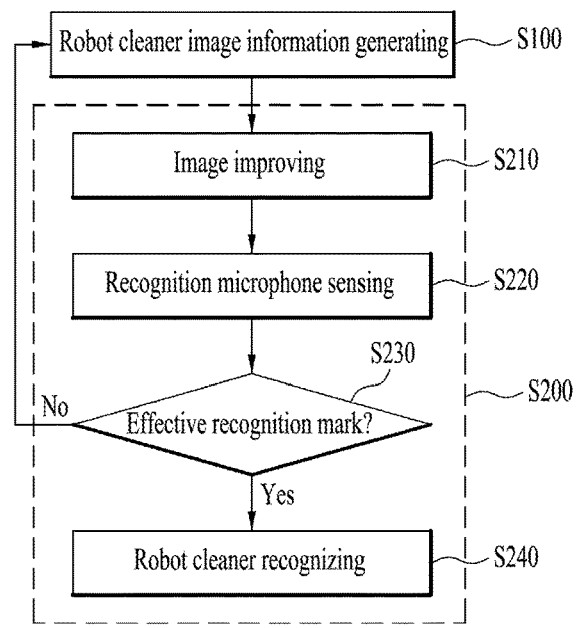
FIG. 15 is a flow chart of a method of sensing the robot cleaner, in accordance with an embodiment as broadly described herein.

As shown in FIG. 15, sensing the robot cleaner 100 (S200) may include improving image quality of the image information (S210), sensing the recognition mark 112 of the robot cleaner 100 (S220), determining whether the sensed recognition mark 112 is effective (S230), and recognizing the robot cleaner 100 (S240).

The step of improving the image quality of the image information (S210) may be performed by the terminal controller 270 of the remote control device 200. More specifically, at least one of image brightness adjustment, noise rejection and color correction may be performed.

The step of recognizing the robot cleaner 100 (S240) may be performed by the terminal controller 270 by recognizing an object having the effective recognition mark 112a s the robot cleaner 100.

In the step of determining whether the sensed recognition mark 112 is an effective recognition mark (S230), if the sensed recognition mark 112 is not the effective recognition mark 112, the method returns to the step of generating image information of the robot 100 and the region near the robot cleaner 100 via the camera 221'.

After sensing the robot cleaner (S200), a step of generating location information of the robot cleaner 100 (S300) may be performed. Specifically, the step (S300) of generating the location information of the robot cleaner 100 may be performed by comparing an actual shape of the recognition mark 112 with a relative shape recognized by the image information. Here, the terminal controller 270 may generate the location information of the robot cleaner 100 based on factors (e.g., a horizontal view angle, H/W ratio, an elevation angle and an azimuth) of the recognition mark 112 recognized by the image information. Accordingly, the actual region and the virtual region may be mapped to each other.

The image information and the location information of the robot cleaner 100 may then be output on the display 241 (S400). In other words, a step of mapping by converting a screen of the display 241 after photographing may be performed. After the mapping step is performed, the photographed image information and location information may be output on the display 241. After the photographed images are displayed on the display 241 consistently, the mapping step may be performed. Accordingly, wireless control may be performed through the display 241, once the mapping is completed.

Figure 16:
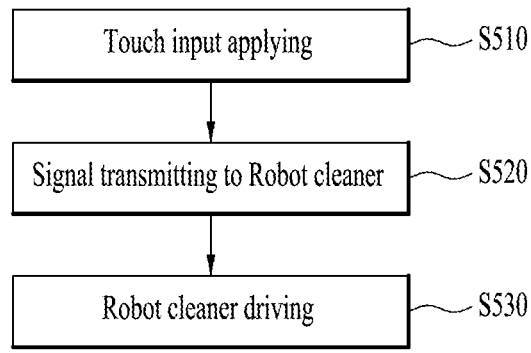
FIG. 16 is a flow chart of a method of providing a location base service, in accordance with an embodiment as broadly described herein.

Here, the terminal controller 270 may display the robot cleaner 100 to be selectable on the screen of the display 241. After that, a step of providing a location bases service based on the location information may be performed (S500). Providing the location based service (S500) may include generating a control signal of the robot cleaner 100 (S510), transmitting the control signal to the robot cleaner(S520), and driving the robot cleaner 100 in accordance with the control signal (S530), as shown in FIG. 16.

Generating the control signal of the robot cleaner 100 (S510) may be performed by applying a touch input to the display 241. Especially, the touch input may be applied by the medium of the image of the robot cleaner 100 and the image of the region near the robot cleaner 100 output on the display 241. As a result, as a preset patterned touch input is applied to drive the robot cleaner 100 so as to provide the location based service, a corresponding control signal may be generated.

As an example of the preset pattern, a circle may be drawn on the screen of the display 241 to designate a predetermined region or a passage having curved lines and straight lines, or partition lines may be drawn to partition off the screen of the display 241.

As the control signal is input by the touch input, the location based service may include at least one of a passage setting function, a cleaning region designating function or a do-not clean region designating function.

Meanwhile, the location based service may include a function of calling the robot cleaner 100 to the location of the remote control device 200, once a voice call signal is input to the remote control device 200.

The microphone 222 may be provided in the remote control device 200 and the remote control device 200 may transmit a voice call signal to the robot cleaner 100 via the microphone 222, only to call the robot cleaner 100 to the location of the remote control device 200, in other words, the user's location.

Figure 17:
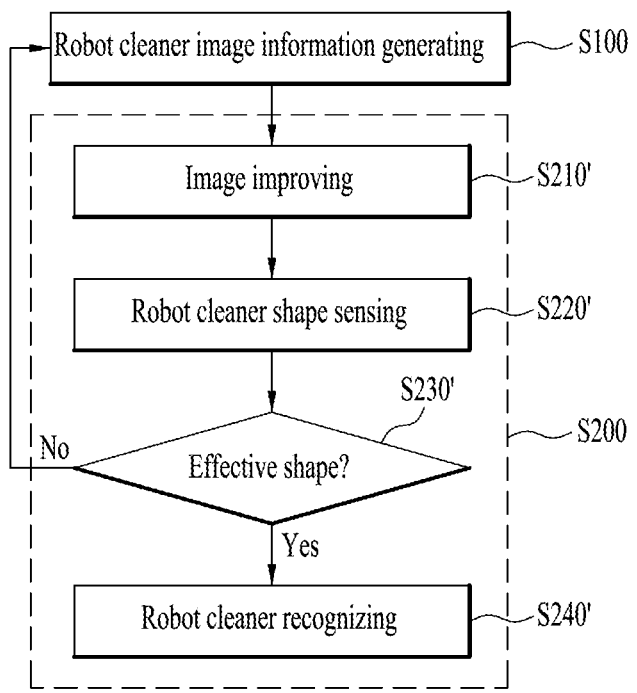
FIG. 17 is a flow chart of a method of sensing the robot cleaner, in accordance with another embodiment as broadly described herein.

FIG. 17 is a flow chart further detailing the step of sensing the robot cleaner (S200), according to another embodiment.

The control method of the robot cleaner system according to this embodiment is identical to the robot cleaner system according to the embodiment, except that the location information of the robot cleaner 100 is generated by sensing shape of the robot cleaner 100.

Sensing the robot cleaner 100 (S200) may include improving an image quality of image information (S201') sensing a shape of the robot cleaner 100 (S220'), determining whether the sensed shape of the robot cleaner 100 is an effective shape (S230'), and recognizing the robot cleaner (S240') as shown in FIG. 17.

The shape of the robot cleaner 100 may be stored in the terminal controller 270 of the remote control device 200 and the shape of the robot cleaner 100 may be sent from the image information.

In the step of determining whether the sensed shape of the robot cleaner 100 is effective (S230'), if the sensed shape is not the effective shape, the method may return to generating image information on the robot cleaner 100 and a region near the robot cleaner 100 using the camera 221' (S100).

Thereafter, location information of the robot cleaner 100 may be generated (S300). Generating the location information of the robot cleaner 100 may be performed by comparing an actual shape of the robot cleaner 100 with a relative shape figured out based on the image information. Here, the terminal controller 270 may generate the location information of the robot cleaner 100 based on factors of the robot cleaner 100 (e.g., a horizontal view angle, H/W ratio, an elevation angle and an azimuth).

Figure 18:
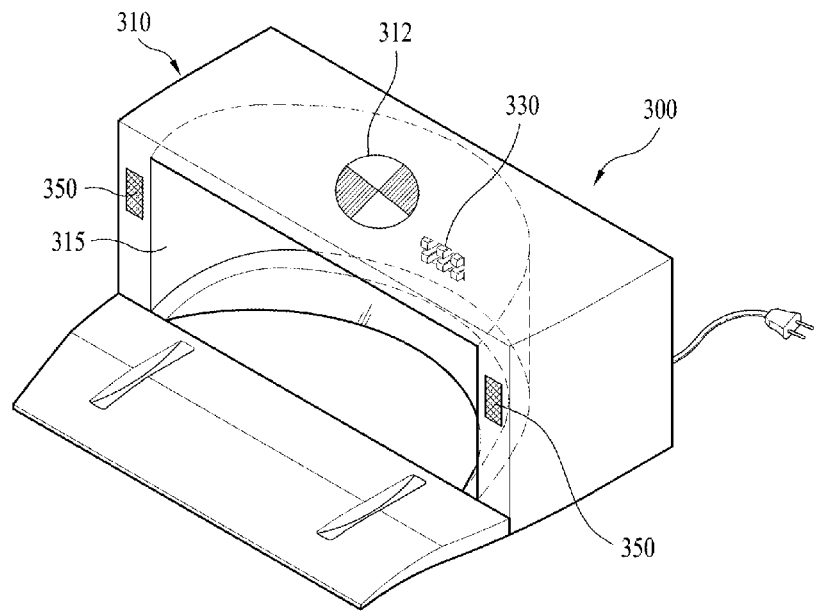
FIG. 18 is a perspective view of an exemplary recharging base provided in the robot cleaner system, in accordance with embodiments as broadly described herein.

Referring to FIG. 18, another embodiment of the recognition means will be described.

Different from what is shown in FIG. 1, a plurality of recognition device may be provided, not one recognition device. The recognition device could be distorted by photographing, and a small error caused in the mapping process could become substantially larger. In addition, the recognition device may be distorted by an external light source (e.g., sunshine and lightening). Accordingly, three or more recognition devices may be provided to compensate for such distortion.

As shown in FIG. 1, the recognition device such as the recognition mark 112 may be provided on an outer surface of the cleaner case 110. Accordingly, the recognition mark 112 may damage an exterior design of the robot cleaner. That is, artificial design patterns may be less desirable on the robot cleaners which may instead tend to show a natural texture.

Accordingly, the recognition device such as the recognition mark 112 may be selectively provided on an outer surface of the case. For example, a detachable sheet type recognition mark 112 may be fabricated to perform the wireless control. For that, the recognition mark 112 may be attached to the outer surface of the case 110, when photographing the robot cleaner 100. Such a recognition mark 112 may be normally detached from the case 110.

For example, a plurality of magnets may be provided in the recognition mark 112 and a corresponding number of magnets may be provided in the case 110. When the user detaches the recognition mark 112, damage to an original exterior design of the robot cleaner can be prevented. Also, it is possible to attach the recognition mark 112 to the cleaner case 110 if necessary. The detached recognition mark 112 may be attached to a door of an electric home appliance (e.g., a refrigerator) and the recognition mark 112 may be fabricated with an easy repair and maintenance.

In the robot cleaner system according to one embodiment may include a recharging base 300 to recharge the robot cleaner. The recognition device mentioned above may be provided in the robot cleaner 100 and/or the recharging base. The location based service similar or identical to the location based service through the recognition device may be provided FIG. 18 illustrates an example of the recharging base 300.

One or more sensors 350 may be provided in the recharging base 300 to transmit and receive a signal to and from the short range communication module 182 of the robot cleaner 100. The communication using the sensors 350 may enable the robot cleaner 100 to return to the recharging base 300.

The recharging base 300 may include a recharging base case 310. A slot 315 may be provided in the case 210 to mount the robot cleaner 100 to the case 310 and a recharging terminal 330 may be provided in the slot 315.

Generally, the robot cleaner 100 recognizes its location and its posture within a house (a cleaning region) based on SLAM (Simultaneous Location and Mapping). Also, the robot cleaner 100 may figure out the location of the recharging base 300 and also a relative location or posture of itself with respect to the recharging base 300.

Like the mapping the actual region to the virtual region with respect to the robot cleaner 100, an actual region and a virtual region with respect to the recharging base 300 may be mapped to each other. Specifically, the same or similar recognition means may be provided even in the recharging base 300. A recognition mark 312 shown in FIG. 18 is provided as one example of the recognition device.

The user may generate the same image information, using the remote control device 200. In other words, an actual region near the recharging base 300 may be mapped to a virtual region displayed on the display of the remote control device 200 by using the recognition mark 312 provided in the recharging base 300. Also, such the mapping may provide the same location based service mentioned above.

For example, the user may designate a region near the recharging base 300 as a cleaning region, while watching the display. The virtual cleaning region as the actual cleaning region may be transmitted to the recharging base 300 or the robot cleaner 100 based on the mapping information. The robot cleaner 100 recognizes a current location with respect to the recharging base 300 and figures out a designated actual region.

For example, when designating a region 5 centimeters distant from the recharging base 300 to the right in virtual regions, the user may designate a region substantially 3 meters distant to the right based on the mapping information. At this time, the robot cleaner is substantially located 5 meters distant from the recharging base 300, only to be not shown in the virtual region. Nevertheless, the robot cleaner 100 is figuring out its location with respect to the recharging base and then driving to the actual region to perform cleaning.

Accordingly, the recognition device may be provided in the recharging base 300 and similar effect can be gained. In this instance, the robot cleaner 100 is not substantially photographed and the recharging base 300 is generally fixed, such that a controllable region may be restricted to the region near the recharging base 300.

As mentioned above, the robot cleaner system capable of providing the location based service by mapping the virtual region and the actual region to each other via the recognition means provided in the robot cleaner 100 or the recharging base 300 and the control method of the robot cleaner system are described in detail. Specifically, the recognition mark as the recognition device is described in detail.

However, the recognition mark 112 and 312 as the recognition means could affect an exterior design of the recharging base 300 provided in the robot cleaner system. If a minimal design expressing an original texture or color of a material is preferred. Such recognition marks 112 and 312 may detract from the exterior design, in an aspect of the minimal design.

Accordingly, recognition devices capable of sensing an original design of the robot cleaner 100 or the recharging base 300 easily, without causing the damage to the original design may be considered.

Figure 19:
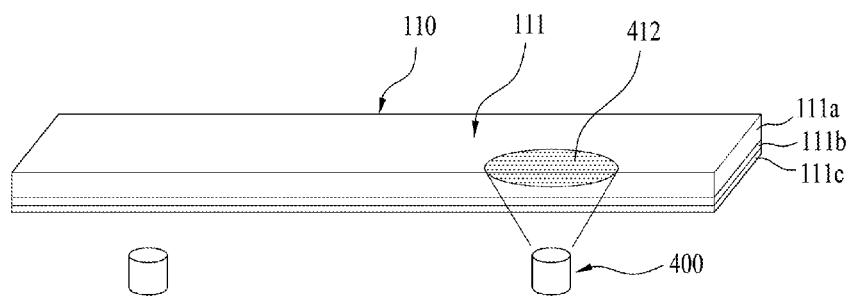
FIG. 19 is a conceptual diagram illustrating a lightening image used as an exemplary recognition device provided in a robot cleaner as embodied and broadly described herein.

As shown in FIG. 19, the case 110 of the robot cleaner 100 may include an outer wall 111. A panel type outer wall 111 is fabricated and the outer wall 111 defines an exterior appearance of the case 110. Various components may be provided in the water wall 111.

In this embodiment, a lighting image 412 may be provided as the recognition device. The lighting image 412 may be selectively activated. In other words, the lighting image 412 may be generated or removed by selective activation of a light source 400.

Specifically, the outer wall 111 may include a color layer 111*b* and a reflective layer 111*c*. The color layer 111*b* is formed in an outer portion and the reflective layer 111*c* may be formed in an inner portion. The color layer 111*b* realizes an exterior design color sense of the case 110.

Basically, external light may not transmit to the inner portion of the outer wall 111 via the reflective layer 111*c* and the user cannot see the inner space of the reflective layer 111*c* from outside of the robot cleaner. Also, a transparent layer 111*a* may be provided on an outer portion of the color layer 111*b* and a smooth and glossy exterior design can be realized.

To selectively generate or activate the lighting image 412, a lighting apparatus 400 may be provided in the reflective layer 111*c*. For example, the lighting apparatus 400 may include an LED lighting apparatus and a LED element. A light may be irradiated outside the case 111 from inside by the activation of the LED lighting apparatus or LED elements. Such a light may form a preset lighting image 412 in the outer wall 111 by transmitting the reflective layer 111*c*.

As shown in FIG. 19, when the lighting apparatus 400 is deactivated, the lighting image 412 is not generated in the outer wall 111 and the lighting apparatus 400 is not seen from the outside. Accordingly, an original design of the product is adversely affected when the lighting apparatus 400 is inactivated.

In contrast, when the lighting apparatus 400 is activated, the lighting image 412 is generated in the outer wall 111 and the remote control device 200 maps a virtual region to an actual region via the lighting image 412.

When using the lighting image 412*a* s the recognition device, the design can be maintained and also the recognition device can be recognized clearly even in a dark environment.

Figure 20:
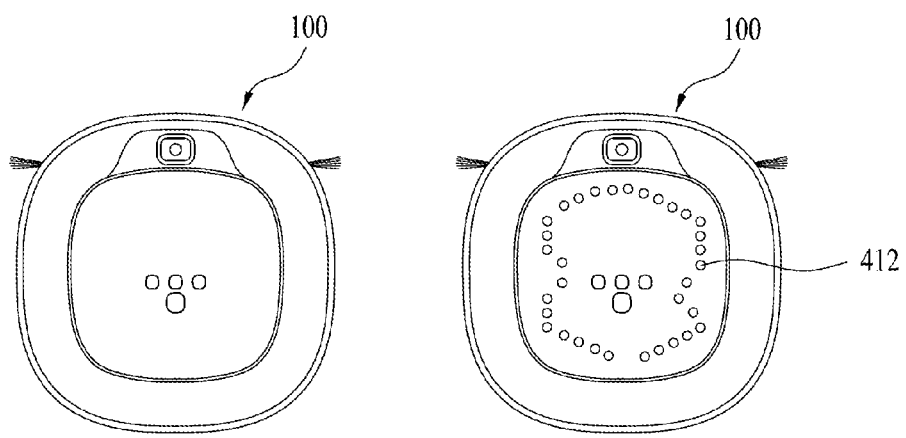
FIG. 20 illustrates a comparison between before and after activating the lightening image shown in FIG. 19.

As shown in FIG. 20, before the light source 400 is activated, a general exterior design of the robot cleaner may be maintained as is. However, when the light source 400 is activated, the lighting image 412 is generated at an outer portion of the case 110 and the user can recognize the generated lighting image 412 easily.

Such lighting images 412 may have various shapes for LED elements, respectively. The lighting apparatus having a plurality of LED elements may form a lighting image in a predetermined region. For example, the LED lighting apparatus may form a circular or polygonal shaped lighting image.

The lighting image 412 is formed by the light source 400 and recognized even in the dark environment easily. Even in a dark room, the robot cleaner can be used easily even with no lighting.

The lighting image 412 may not be always activated and visible, and it is preferred that the lighting image 412 is activated only when necessary.

Figure 14:
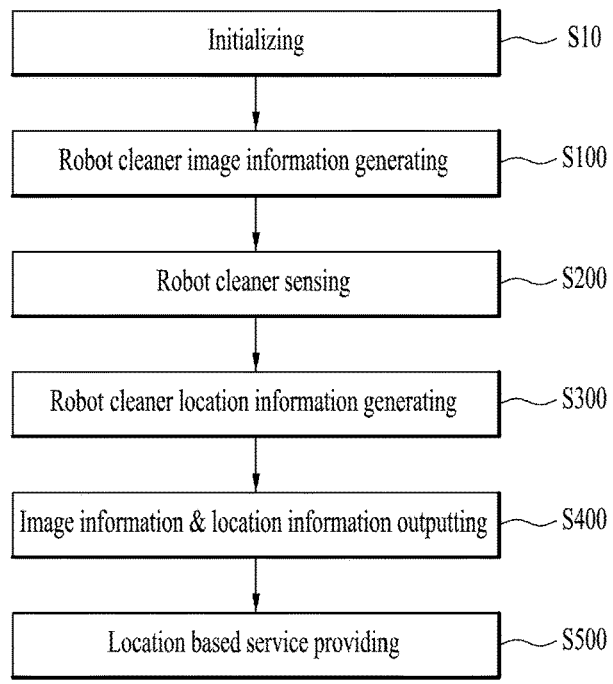
FIG. 14 is a flow chart of a control method of a robot cleaner system, in accordance with embodiments as broadly described herein.

When the user performs remote-control for the robot cleaner 100 or using the location based service, using the remote control device 200 as shown in FIG. 14, the lighting image 412 may be activated. In other words, the lighting image 412 may be activated in the initializing step (S10). The following steps may then be performed after the initialization step (S10).

For example, the service including the remote control may be performed by an application installed in the remote control device 200. Once the user implements the application on the remote control device 200, the remote control device 200 may transmit an implementing command to the robot cleaner 100. The robot cleaner 100 applies the electric power to the lighting apparatus 400 based on the implementing command, to activate the lighting image 412.

In other words, the lighting image 412 may be activated by the remote control device 100 in the initialization step (S10). After that, the activation of the lighting image 412 may be maintained consistently while the location based service is performed in accordance with the application. Once the application is ended, the activation of the lighting image 412 may be ended.

As mentioned above, the lighting image 412 may be activated only when the remote control device 200 is used. Other people as well as the user watching the robot cleaner 100 can intuitively figure out that the remote control device 200 is used. The lighting image 412 may realize a unique design and a new design, and also it may provide a pleasant function as well as an original function of the cleaner.

Meanwhile, the recognition device may be formed in various types and the location of the recognition device may be changeable variously. In addition, the shape and number of the recognition device may be changeable variously.

The recognition device(s) may be used in mapping the actual region to the virtual region precisely. It is preferred that a mapping error is reduced by the recognition mean. An error caused in a small region mapped to a large region may be much larger.

For precise and minute mapping, the recognition means may be provided in a plurality of regions, for example, three or more. In this instance, the recognition means having various shapes may be provided.

Generally, a circular image is likely to have the least distortion at various angles, because a center of a circle can be easily determined. The plurality of recognition devices may include a circular image or mark.

A light through a window or lighting may be reflected on the outer surface of the case 110 by a light source (e.g., external lighting and sunlight). However, the upper surface of the case 110 may be a gently curved surface and such reflection may be partially generated in the upper surface of the case 110. The reflection may distort the recognition means.

To deal with this, the plurality of recognition devices may be provided as mentioned above. Different from what is shown in FIG. 1, the recognition devices may be provided at left upper and lower portions of the upper surface of the case and right upper and lower portions of the upper surface. Accordingly, increased error due to distortion of the recognition device by the external light source may be avoided.

Figure 21A:
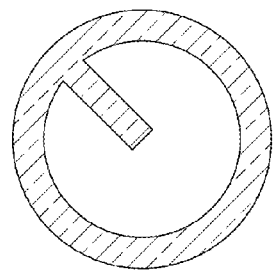
FIGS. 21A-21D illustrate exemplary recognition devices.
Figure 21B:
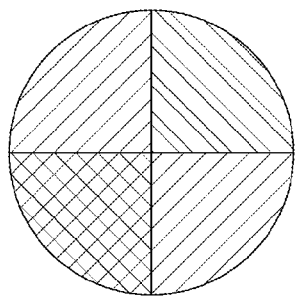
Figure 21C:
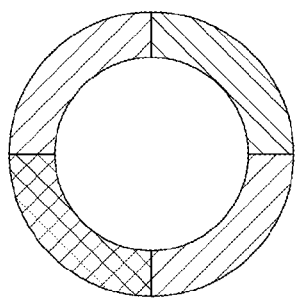
Figure 21D:
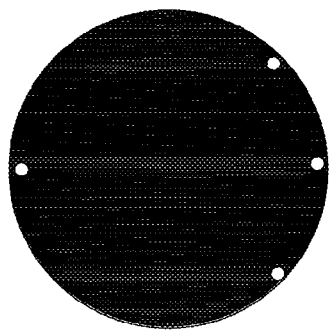

FIGS. 21A-21D illustrate various types of recognition devices, which may be a mark or a light image. The recognition devices may have various colors, especially, vivid primary colors. For example, the recognition devices may be a visual mark as shown in FIGS. 21A, 21B and 21C or a solid mark as shown in FIG. 21D. The recognition device may figure out a linear portion reflected on the plane and it is necessary to provide two connected points allowing the linear portion to be seen clearly in the recognition device.

Figure 22:
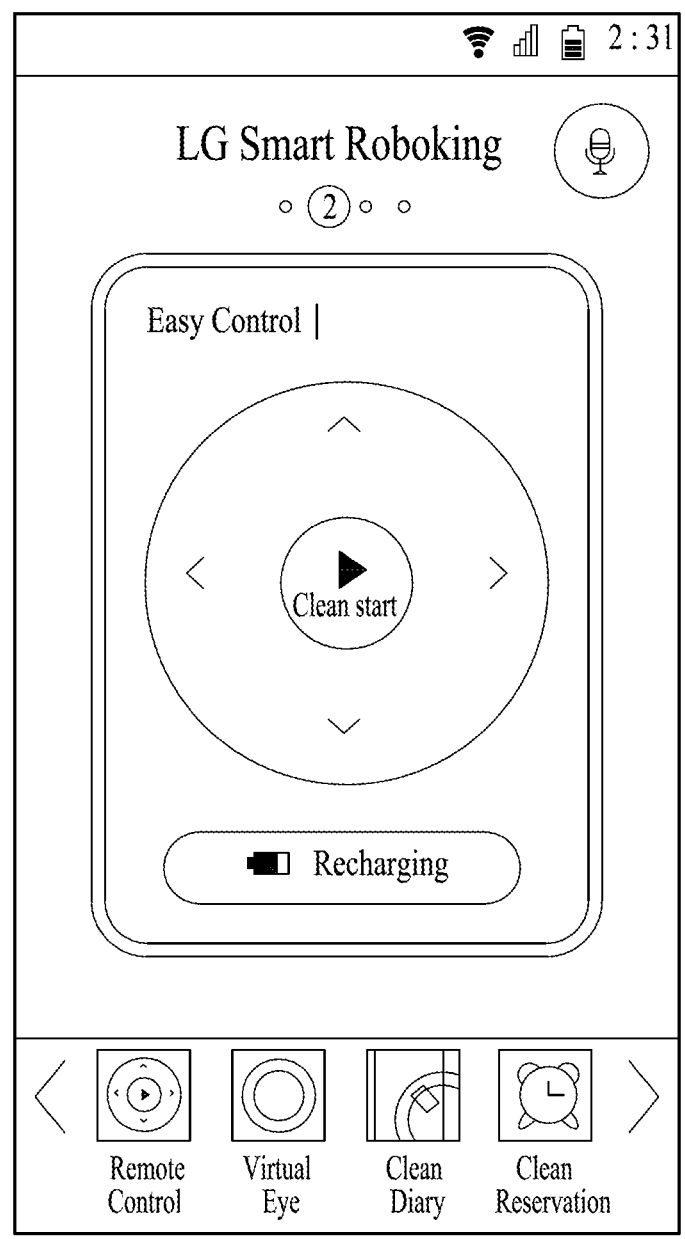
FIG. 22 is an initial image of implementing an application in the remote control device, in accordance with embodiments as broadly described herein.

FIG. 22 illustrates an exemplary screen displayed on the remote control device 200, which may be referred to as an initial screen of an implemented application. The user can select various contents on the application initializing screen.

For example, an icon indicating remote control may be displayed on the initialization screen and the location based service mentioned above may be implemented by the remote control icon.

The robot cleaner system and the control method of the robot cleaner system mentioned above have been described with reference to a number of illustrative embodiments thereof. However, it should be understood that numerous other modifications and embodiments may be devised by those skilled in the art that will fall within the spirit and scope of the principles as broadly described herein. More particularly, various variations and modifications are possible in the component parts and/or arrangements of the subject combination arrangement within the scope of the disclosure, the drawings and the appended claims. In addition to variations and modifications in the component parts and/or arrangements, alternative uses may also be apparent to those skilled in the art.

Exemplary embodiments provide a robot cleaner and a control method of the same that may enhance product reliability and satisfaction by providing a pleasure and an original function of cleaning to a user.

Exemplary embodiments may also provide a robot cleaner system and a control method of the same that may precisely measure a relative position between the robot cleaner and the user.

Exemplary embodiments may also provide a robot cleaner system and a control method of the same that may control a robot cleaner wirelessly, even without the user watching the robot cleaner directly.

Exemplary embodiments may also provide a robot cleaner system and a control method of the same that may map a cleaning region recognized by a display of a remote control device with an actual cleaning region.

Exemplary embodiments may also provide a robot cleaner system and a control method of the same that may prevent damage to an external design thereof and allows the user to determine wireless operation easily.

Exemplary embodiments may also provide a robot cleaner system and a control method of the same that may enhance use convenience by providing a location base service based on location information between the robot cleaner and the user.

Exemplary embodiments may also provide a robot cleaner system and a control method of the same that may be operated by the user intuitively and elaborately via a touch input for the robot cleaner displayed on the display of the remote control device and for an image of nearby regions.

A robot cleaner system, as embodied and broadly described herein, may include a robot cleaner configured to perform cleaning, while driving automatically; a recharging base for the robot cleaner; and a remote control device configured to perform remote-control of the robot cleaner, wherein the remote control device generates mapping information between an actual region and a virtual region based on image information generated by a camera on the robot cleaner and a region near the robot cleaner or image information generated by a camera on the recharging base and a region near the recharging base. A location based service may be performed or provided based on the mapping information. Specifically, the robot cleaner may be controlled wirelessly.

In certain embodiments, the recharging base may be omitted, and the robot cleaner system may not include the recharging base. Then, the generation of the image information on the recharging base need not be performed and only the location based service for the robot cleaner may be performed.

The remote control device may generate location information and posture information of the robot cleaner or location information and posture information of the recharging base by sensing the robot cleaner or the recharging base based on the image information.

The remote control device may generate the mapping information between the actual region and the virtual region by comparing an actual shape of the robot cleaner or an actual shape of the recharging base with a relative shape recognized from the image information.

Recognition means may be provided in the robot cleaner or the recharging base to generate the mapping information. Such recognition means may be recognized through the camera clearly. However, the recognition means may be a type of recognition means directly seen by the user, in other words, the means recognizable via a visible ray.

The remote control device may generate the mapping information by comparing actual shape information of the recognition means with relative shape information recognized by the image information.

The remote control device may include a display configured to display the image information; and an input unit configured to input a control signal of the robot cleaner thereto. The display may include a touch sensor functioned as the input unit configured to sense touch input. Accordingly, it is possible to form a free pattern on a virtual region of the display rather than simply touching a button icon and to control the robot cleaner wirelessly. The user may be provided with the simple cleaning and a pleasure.

The recognition means may include a recognition mark provided in an outer circumferential surface of a case provided in the robot cleaner or the recharging base. The recognition mark may be selectively detachable from the outer circumferential surface of the case.

A plurality of recognition means may be provided in the case of the robot cleaner. Distortion which might be generated in the recognition means and an error caused by the distortion can be minimized. Accordingly, more minute wireless control can be performed.

The recognition means may include a LED lighting configured to provide a light toward an outside of the case from an inside of the case provided in the robot cleaner or the recharging base. Such LED lighting may be selectively activated and it may normally be inactivated. The LED lighting may be activated only for the remote control.

An outer wall of the case may include a color layer and a reflective layer from the outside, and the LED lighting is provided under the reflective layer and the LED lighting visually exposed to the outer wall of the case, in an inactivated state, is excluded. Accordingly, a unique exterior design of the robot cleaner may not be damaged and also a minimal exterior design can be realized.

The LED lighting may be activated in accordance with a control signal of the remote control device, when an application for controlling the robot cleaner is implemented in the remote control device. The application may be a combined application for other icons as well as an icon for initializing the remote control.

In this instance, other icons may be input and the LED lighting may be activated when an icon for initializing the remote control is input.

A control method of a robot cleaner system including a robot cleaner, a recharging base for the robot cleaner and a remote control having a camera and a display, as embodied and broadly described herein, may include a step of generating image information on the robot cleaner and a region near the robot cleaner, using the camera; a step of mapping an actual region to a virtual region displayed on the display based on the image information; and a step of performing a location based service of the robot cleaner through the virtual region displayed on the display.

The mapping step may include a step of sensing the robot cleaner or the recharging base based on the image information; and a step of generating location information on the robot cleaner or the recharging base.

The sensing step may perform at least one of image brightness controlling, noise rejection and color correction to improve an image of the image information.

The step of providing the location based service may convert an input of driving the robot cleaner via touch input on the virtual region displayed on the display into a driving command signal of the robot cleaner in the actual region based on the mapping information. In the step of providing the location based service, the driving command signal of the robot cleaner may be generated by a touch input on the virtual region displayed on the display.

The location based service may include at least one of a passage setting function, a cleaning region designating function, a do-not cleaning region designating function and a moving-to-the user setting function.

The control method of the robot cleaner system may further include a step of activating recognition means provided in the robot cleaner or the recharging base. Accordingly, an exterior design of the robot cleaner or the recharging base can be maintained as it is normally.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A remote control device configured to perform remote-control of a robot cleaner, wherein the remote control device is arranged to generate mapping information between an actual region and a virtual region based on image information generated by a camera on the remote control device of a region.

2. The remote control device of claim 1, wherein the region is a region near the robot cleaner or a region near a recharging base for the robot cleaner.

3. The remote control device of claim 1, wherein the remote control device is arranged to generate location information and posture information of the robot cleaner or location information and posture information of a recharging base for the robot cleaner by sensing the robot cleaner or the recharging base based on the image information.

4. The remote control device of claim 3, wherein the remote control device is arranged to generate the mapping information by comparing actual shape information of recognition means on the robot cleaner or recharging base with relative shape information recognized by the image information.

5. The remote control device of claim 4, wherein the remote control device comprises:
a display configured to display the image information; and
an input unit configured to receive input.

6. The remote control device of claim 5, wherein the display comprises a touch sensor functioned as the input unit configured to sense touch input.

7. The remote control device of claim 6, further comprising a wireless communications unit arranged to transmit a control signal in response to the touch input.

8. The remote control device of claim 7, wherein the control signal comprising a driving command signal for the robot cleaner.

9. The remote control device of claim 8, wherein the driving command signal comprises a command for the robot cleaner to perform a location-based service.

10. The remote control device of claim 9, wherein the location-based service comprises setting a cleaning region of the robot cleaner via the touch input by designating a virtual region on the screen of the display, and wherein the remote control device is configured to map the virtual region with an actual region and transmit an actual motion coordinate to the robot cleaner.

11. The remote control device of claim 9, wherein the location-based service comprises setting a passage of the robot cleaner via the touch input of an image of the room output on the display.

12. The remote control device of claim 9, wherein the location-based service comprises setting a do-not-clean region via the touch input by designating a no-cleaning line on the screen of the display to set an outer region with respect to partitioning lines on the room corresponding to the no-cleaning line as the do-not-clean region.

13. The remote control device of claim 9, wherein the location-based service comprises, in response to a user inputting a present mention to a microphone of the remote control device, the robot cleaner moving to the location of the remote control device.

14. The remote control device of claim 1, further comprising a memory for storing information on a recognition mark on the robot cleaner or a charging device for the robot cleaner.

15. The remote control device of claim 14, further comprising a terminal controller configured to extract a recognition mark from an image of the image information and determine whether the extracted recognition marker is available such that the robot cleaner can be sensed based on the result of the determination.

16. The remote control device of claim 15, wherein the terminal controller is arranged to check a shape, pattern or a specific color of the recognition mark to extract the recognition mark from the image of the image information.

17. The remote control device of claim 15, wherein the terminal controller is arranged to improve the image quality of the image information before extracting the recognition mark from the image of the image information.

18. The remote control device of claim 15, wherein the terminal controller is configured to perform image brightness control, noise rejection and color correction to improve the image quality of the image information.

19. The remote control device of claim 15, wherein the terminal controller is configured to compare the actual shape of the recognition mark with the relative shape extracted from the image information and determine the location and posture of the robot cleaner based on the result of the comparison.

20. The remote control device of claim 15, wherein the terminal controller is configured to determine a distance between the user and the robot cleaner and a photographing angle, and/or the scale between the virtual region displayed on the image information and the actual region, based on the result of the comparison.

* * * * *